United States Patent
Walling

(10) Patent No.: US 10,369,474 B2
(45) Date of Patent: Aug. 6, 2019

(54) VIRTUAL PERFORMANCE SYSTEM

(71) Applicant: NIKE, Inc., Beaverton, OR (US)

(72) Inventor: Willoughby H. Walling, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/591,271

(22) Filed: May 10, 2017

(65) Prior Publication Data

US 2017/0239577 A1    Aug. 24, 2017

Related U.S. Application Data

(63) Continuation of application No. 13/491,282, filed on Jun. 7, 2012, now Pat. No. 9,669,311.
(Continued)

(51) Int. Cl.
*A63B 71/00* (2006.01)
*A63F 13/65* (2014.01)
(Continued)

(52) U.S. Cl.
CPC .............. *A63F 13/65* (2014.09); *A63F 13/06* (2013.01); *A63F 13/10* (2013.01); *A63F 13/20* (2014.09);
(Continued)

(58) Field of Classification Search
CPC ........ A63F 13/65; A63F 13/35; A63F 13/211; A63F 13/25
See application file for complete search history.

(56) References Cited

U.S. PATENT DOCUMENTS 6,463,385 B1    10/2002   Fry
6,571,143 B1    5/2003    Mallamo
(Continued)

FOREIGN PATENT DOCUMENTS

CN    1975748 A    6/2007
CN    101961542 A   2/2011
(Continued)

OTHER PUBLICATIONS

Sep. 18, 2012 (WO) International Search Report and Written Opinion—App. No. PCT/US2012/041367.
(Continued)

*Primary Examiner* — James S. McClellan
*Assistant Examiner* — Kevin M Carter
(74) *Attorney, Agent, or Firm* — Banner & Witcoff, Ltd.

(57) ABSTRACT

Aspects of this disclosure relate to rewarding users of an electronic game for real-world physical activity. Further aspects relate to altering virtual items based upon physical activity. An electronic game may comprise or otherwise relate to an online world (such as a "Virtual World"). Users may be represented through customized graphical representations, such as avatars. An account of a user (or entity) may be associated a "virtual region." A threshold level of real-world physical activity may result in obtaining a reward that may be associated with a virtual item. A reward may be configured to result in: (1) altering visual appearance of a virtual item within a virtual region; (2) altering a virtual characteristic of a virtual item, such that the first user may engage in at least one additional virtual activity using that virtual item; and/or (3) acquiring a new virtual item for a virtual region.

20 Claims, 15 Drawing Sheets

Related U.S. Application Data

(60) Provisional application No. 61/494,310, filed on Jun. 7, 2011.

(51) Int. Cl.

| | | |
|---|---|---|
| *A63F 13/85* | (2014.01) | |
| *A63F 13/212* | (2014.01) | |
| *A63F 13/69* | (2014.01) | |
| *A63F 13/40* | (2014.01) | |
| *A63F 13/20* | (2014.01) | |
| *A63F 13/211* | (2014.01) | |
| *A63F 13/213* | (2014.01) | |
| *A63F 13/215* | (2014.01) | |
| *A63F 13/25* | (2014.01) | |
| *A63F 13/32* | (2014.01) | |
| *A63F 13/332* | (2014.01) | |
| *A63F 13/335* | (2014.01) | |
| *A63F 13/35* | (2014.01) | |

(52) U.S. Cl.
CPC .......... *A63F 13/211* (2014.09); *A63F 13/212* (2014.09); *A63F 13/213* (2014.09); *A63F 13/215* (2014.09); *A63F 13/25* (2014.09); *A63F 13/32* (2014.09); *A63F 13/332* (2014.09); *A63F 13/335* (2014.09); *A63F 13/35* (2014.09); *A63F 13/69* (2014.09); *A63F 13/85* (2014.09); *A63F 2300/1012* (2013.01); *A63F 2300/609* (2013.01); *A63F 2300/69* (2013.01); *A63F 2300/8082* (2013.01)

(56) References Cited

U.S. PATENT DOCUMENTS

| | | | | |
|---|---|---|---|---|
| 6,842,877 | B2 | 1/2005 | Robarts et al. | |
| 6,881,176 | B2* | 4/2005 | Oishi | A63B 24/00 482/7 |
| 7,038,855 | B2* | 5/2006 | French | A63B 24/0003 359/629 |
| 7,837,595 | B2* | 11/2010 | Rice | A63B 71/0622 434/61 |
| 7,840,346 | B2* | 11/2010 | Huhtala | A63B 24/0062 701/439 |
| 8,206,219 | B2 | 6/2012 | Shum et al. | |
| 9,848,172 | B2* | 12/2017 | DeAngelis | A63B 24/0021 |
| 2008/0096726 | A1* | 4/2008 | Riley | A63B 24/0006 482/8 |
| 2008/0103794 | A1* | 5/2008 | Pettiross | G06Q 30/02 705/2 |
| 2008/0146334 | A1* | 6/2008 | Kil | G06Q 40/08 463/36 |
| 2009/0098939 | A1 | 4/2009 | Hamilton, II et al. | |
| 2010/0004097 | A1* | 1/2010 | D'Eredita | A63B 24/0087 482/8 |
| 2010/0048272 | A1 | 2/2010 | Koh | |
| 2010/0088023 | A1* | 4/2010 | Werner | A63B 24/0021 701/467 |
| 2010/0137064 | A1 | 6/2010 | Shum et al. | |
| 2011/0098928 | A1* | 4/2011 | Hoffman | A63B 24/0062 702/5 |
| 2011/0112662 | A1 | 5/2011 | Thompson et al. | |
| 2011/0179458 | A1* | 7/2011 | Eisner | A63K 1/00 725/105 |
| 2011/0199376 | A1 | 8/2011 | Salemann | |
| 2012/0084053 | A1 | 4/2012 | Yuen et al. | |

FOREIGN PATENT DOCUMENTS

| | | | |
|---|---|---|---|
| EP | 1574240 | A2 | 9/2005 |
| JP | 2000024324 | A | 1/2000 |
| JP | 2002049681 | A | 2/2002 |
| JP | 2002159742 | A | 6/2002 |
| JP | 2003062353 | A | 3/2003 |
| JP | 2004064398 | A | 2/2004 |
| JP | 2007115200 | A | 5/2007 |
| KR | 20040042120 | A | 5/2004 |
| KR | 20050023511 | A | 3/2005 |
| KR | 20100086052 | A | 7/2010 |
| WO | 2011031335 | A2 | 3/2011 |

OTHER PUBLICATIONS

Sep. 18, 2012 (WO) International Search Report and Written Opinion—App. No. PCT/US2012/041370.

Matt Casamassina: "Wii Fit Review," http://www.ign.com/articles/2008/05/19/wii-tit-review; May 19, 2008 (12 pages).

John Gaudiosi: "Players face real weather in new sports video games," http://www.reuters.com/article/2009/08/20/us-media-videogames-idUSTRE57J73920090820; Aug. 20, 2009 (4 pages).

Dec. 27, 2013(WO)International Preliminary Report on Patentability—App.No. PCT/US2012/041367.

Dec. 27, 2013 (WO) International Preliminary Report on Patentability App. No. PCT/US2012/041370.

*Virtual Performance System*, U.S. Appl. No. 13/491,294 U.S. Pat. No. 9,289,683, filed Jun. 7, 2012 Mar. 22, 2016.

* cited by examiner

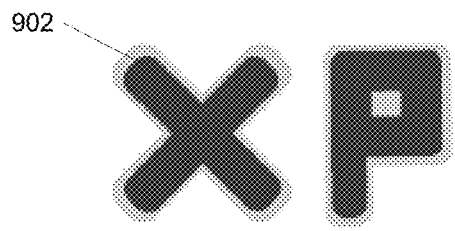
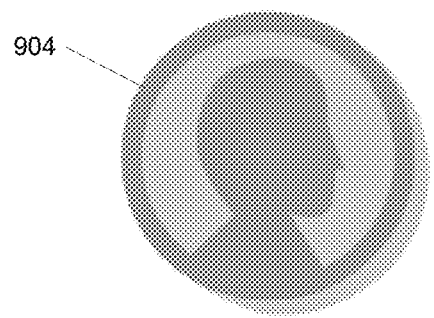
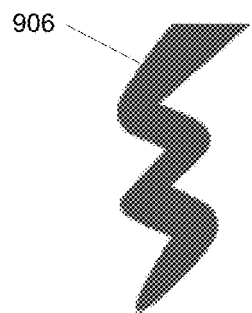
FIG. 9

VIRTUAL PERFORMANCE SYSTEM

CROSS-REFERENCE TO RELATED APPLICATIONS

This application is a continuation of U.S. patent application Ser. No. 13/491,282 entitled "Virtual Performance System" and filed on Jun. 7, 2012, which claims the benefit of and priority to U.S. Provisional Patent Application No. 61/494,310 entitled "Virtual Performance System" and filed on Jun. 7, 2011, each of which is incorporated by reference in its entirety.

This application is also related to U.S. Pat. No. 9,289,683 entitled "Virtual Performance System" which issued on Mar. 22, 2016, and which is also incorporated by reference in its entirety.

BACKGROUND

Electronic forms of entertainment have drastically increased over the last decade. A large part of this increase is due to rising popularity of electronic games. Electronic games are no longer targeted to pre-teens and teenagers, but rather are enjoyed by every possible demographic group. As individuals increasingly engage electronic gaming, they may spend less time participating in sports and other forms of physical activity. This is especially worrisome as the decline in physical activity has been associated with obesity and other related health concerns. Moreover, sporting events and other forms of physical activity historically provided a source of social interaction.

Attempts to combat this have focused on electronic games that require a user to stand in front of a display and attempt to work out with sensors attached to their body or in the confined area of an indoor room that is not suited for physical performance.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to processing of data taken while a user performs an athletic activity. Certain embodiments relate to determining whether a user performs a threshold level of physical activity (e.g., athletic activity). In certain embodiments, determinations of athletic activity may comprise estimating energy expenditure such as, for example, an amount of calories burned. In certain embodiments, energy expenditure calculations comprise determinations relating to: effort, oxygen consumed, and/or oxygen kinetics of the user.

Example embodiments may relate to a system, method, apparatus, and non-transitory computer readable media configured for prompting a user to perform an exercise, monitoring form of the user while performing the exercise, and calculating an energy expenditure estimate for the user performing the exercise based on a type of the exercise and on the form of the user. In various aspects, a system, method, apparatus, and/or computer readable media may be configured for processing data captured of a user performing an athletic activity over a time interval, and determining a location of a center of mass of a body part, body region, or entire body of the user at a first time instant and at a second time instant within the time interval. In further aspects, a system, method, apparatus, and/or computer readable media may be configured for identifying a change in the location of the center of mass from the first time instant to the second time instant, and calculating an energy expenditure estimate for the user due to the change.

Aspects of this disclosure relate to rewarding users of an electronic game for real-world physical activity and/or movements. Further aspects relate to altering virtual items based upon physical activity. In various implementations, the electronic game may comprise or otherwise relate to an online world (such as a "Virtual Universe" or a "Virtual World"). Users, which may be individuals and/or entities, may be represented through customized graphical representations, such as avatars. In accordance with various embodiments, an account of a user (or entity) of a virtual world 300 may be associated a "virtual region." Certain embodiments may identify a first threshold level of real-world physical activity to obtain a first reward associated with the virtual item. In one embodiment, based upon characteristics of a virtual item of a virtual region, a reward may be generated for real-world activity. In one embodiment, the reward may be configured to result in at least one of: (1) altering visual appearance of a virtual item within the first virtual region; (2) altering a virtual characteristic of a virtual item with the first virtual region, such that the first user may engage in at least one additional virtual activity using the virtual item; and/or (3) acquiring a new virtual item for the first virtual region.

In one embodiment, a first threshold activity may be based up determinations selected from the group consisting of: energy expenditure, distance, pace and combinations thereof. In various implementations, upon determining that a user performed the first threshold of activity and before providing a reward, the user may be prompted to a select a reward from a plurality of rewards. In further aspects of the embodiment, upon determining that the user has the first threshold activity, the user may be awarded a first quantity of points of a first point system that may be used to perform a virtual activity within the virtual world. The points may be a second award in addition to another award.

Certain embodiments may estimate a geographic location of a user and determine an environmental condition of the estimated geographic location. In one embodiment, a reward may be altered based on at least one environmental condition. In one embodiment, the virtual region may be altered to visually reflect a quality of an environmental condition. According to one embodiment, a second reward having criteria requiring the first user to perform a second threshold level of physical activity may be implemented.

In further embodiments, an avatar may be presented in the virtual world performing a virtual activity based upon a determined real-world athletic activity. In certain embodiments, it may be determined that the real-world weather condition is adverse to performance of the first real-world athletic activity. In one embodiment, a quantity of points, virtual goods or services, or any reward may be adjusted based on the determining that the real-world weather condition is adverse to the performance of the first real-world athletic activity.

In certain embodiments, a determination that that the first user did not satisfy the activity threshold may result in the alteration of virtual region associated with a second user that is different from the first user. Points may also be deducted from one or more users. In further embodiments, an avatar associated with a celebrity may partially or completely destroy a virtual item included within the virtual world. A virtual item may be removed. In yet another embodiment, a virtual team associated with the first virtual region to perform less athletically during a virtual sporting event.

In yet other embodiments, one or more processors may determine, from sensor data, that at least a first user and a second user are performing a first real-world athletic activity and display on a virtual scoreboard a first score representing the first user's performance of the first real-world activity and a second score representing the second user's performance of the first real-world activity. In some embodiments, a virtual weather condition of at least one of the first virtual region or the second virtual region may be adjusted.

These and other aspects of the embodiments are discussed in greater detail throughout this disclosure, including the accompanying drawings.

BRIEF DESCRIPTION

Figure 4A:
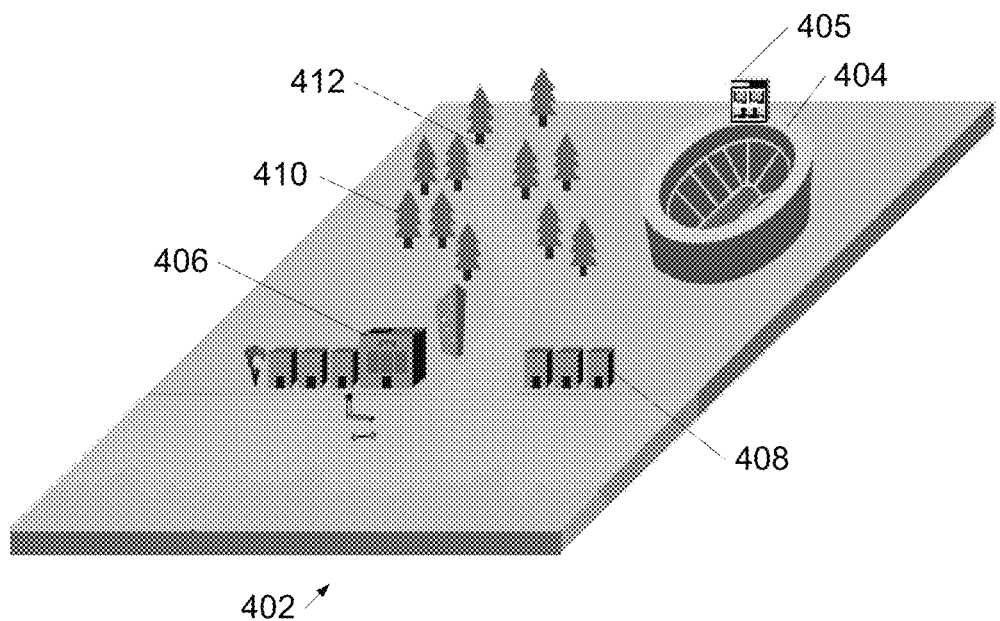
Figure 4B:
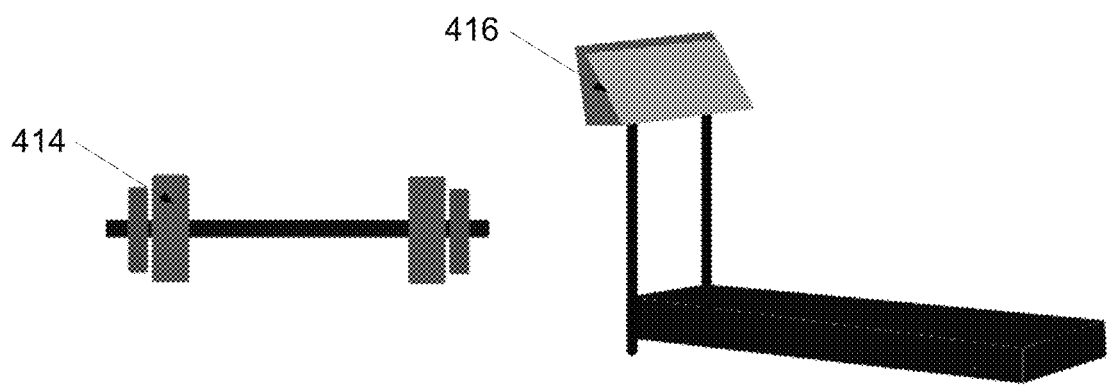
Figure 4C:
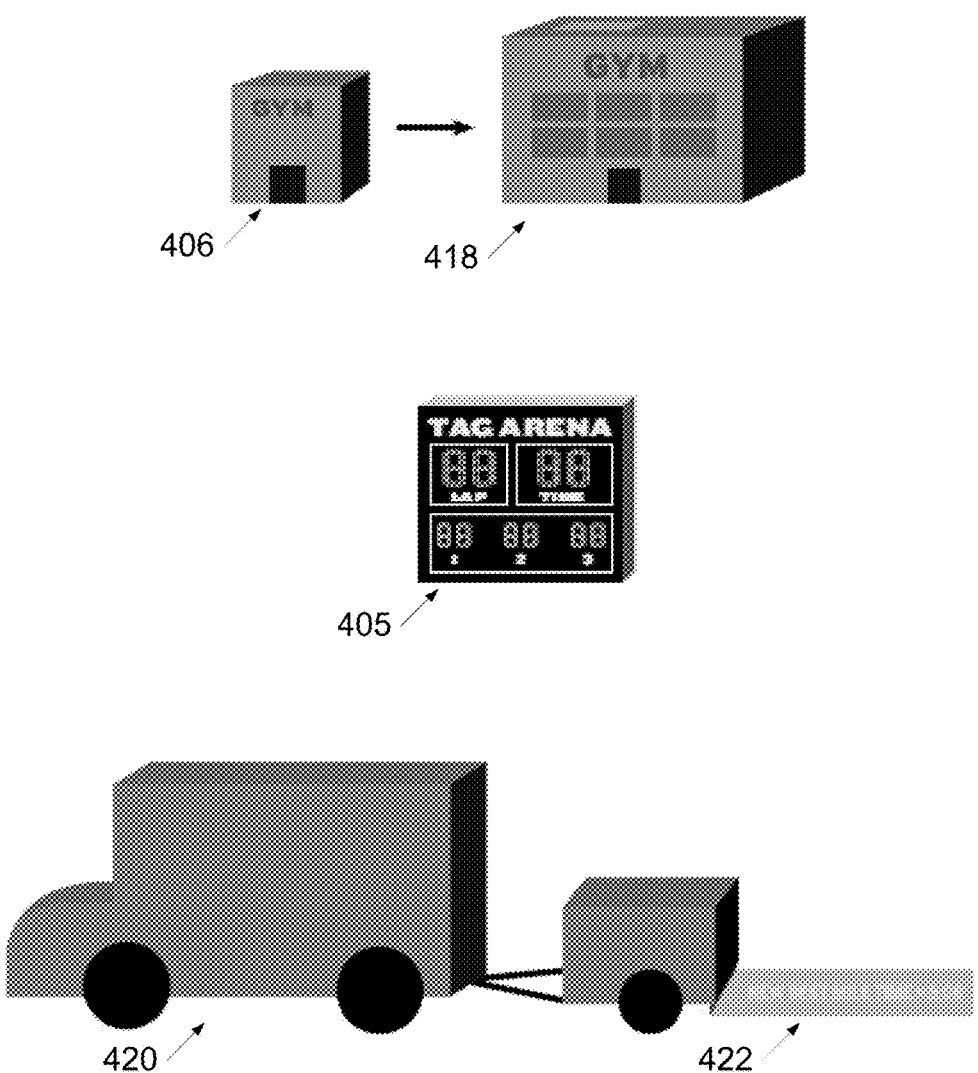
Figure 5:
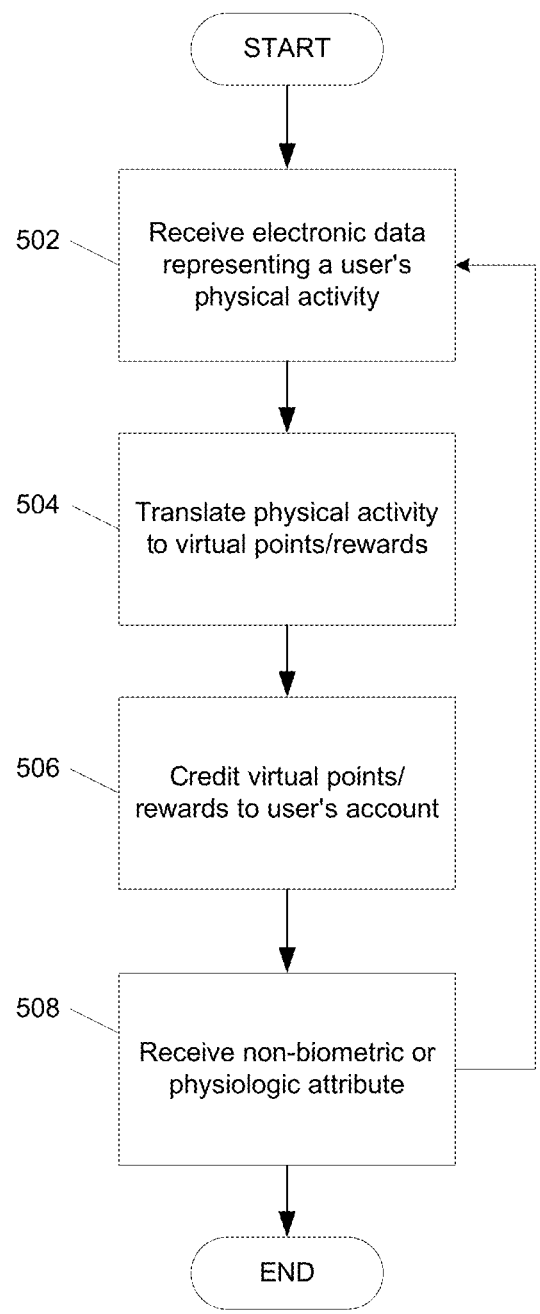
Figure 6:
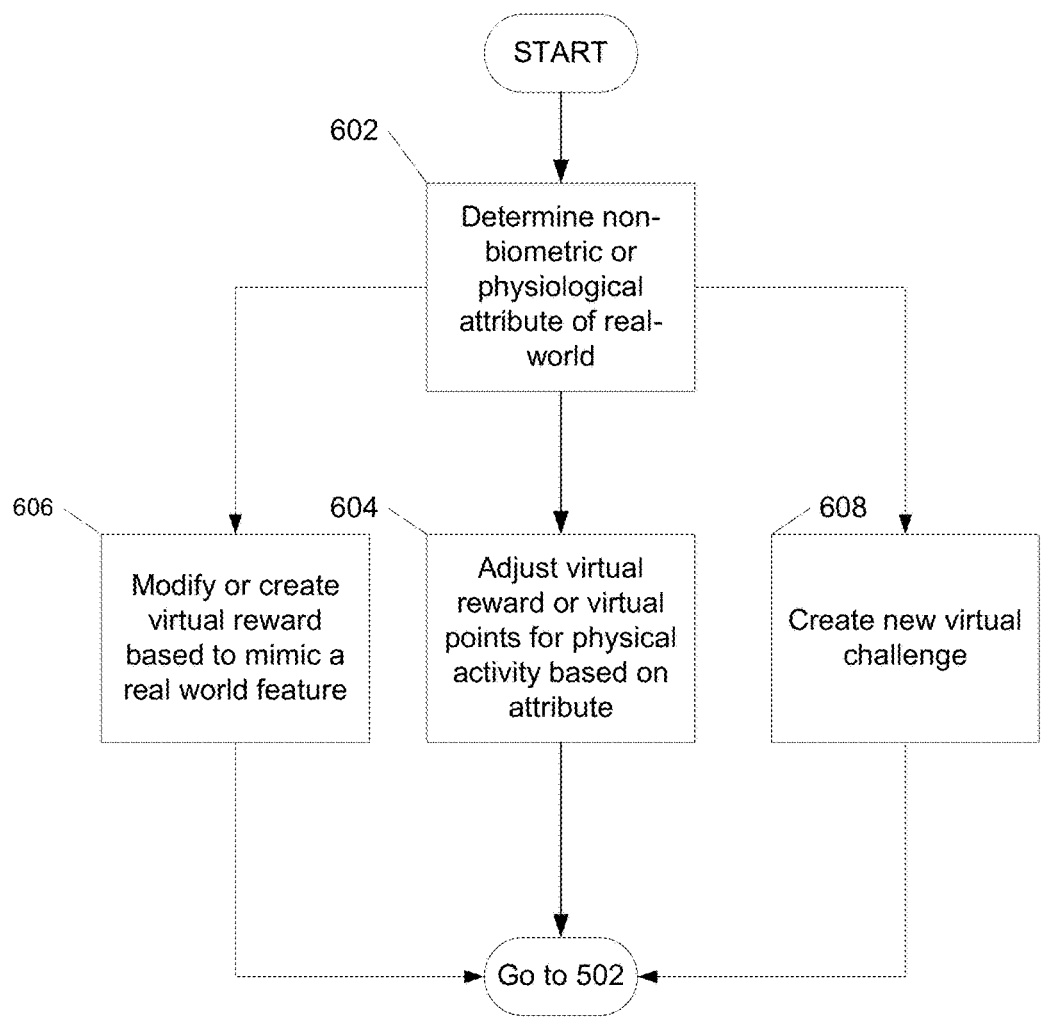
Figure 7:
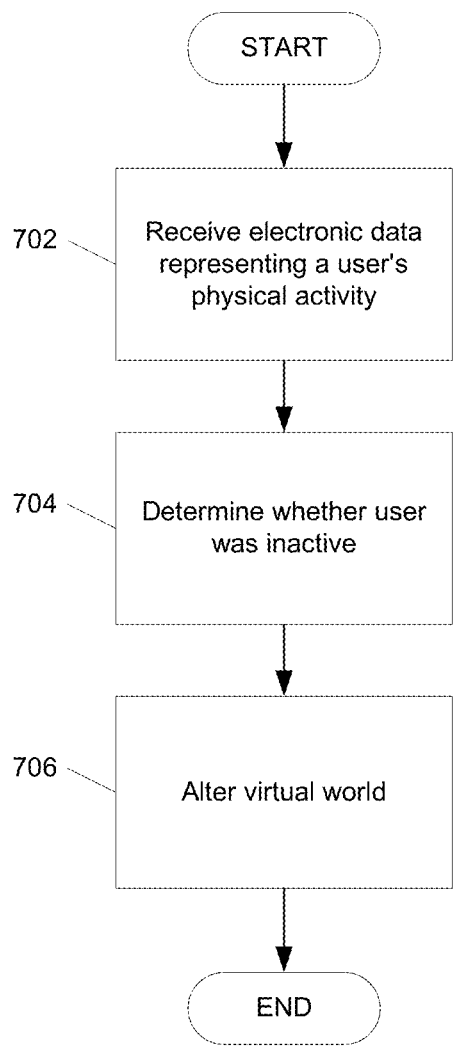
Figure 8:
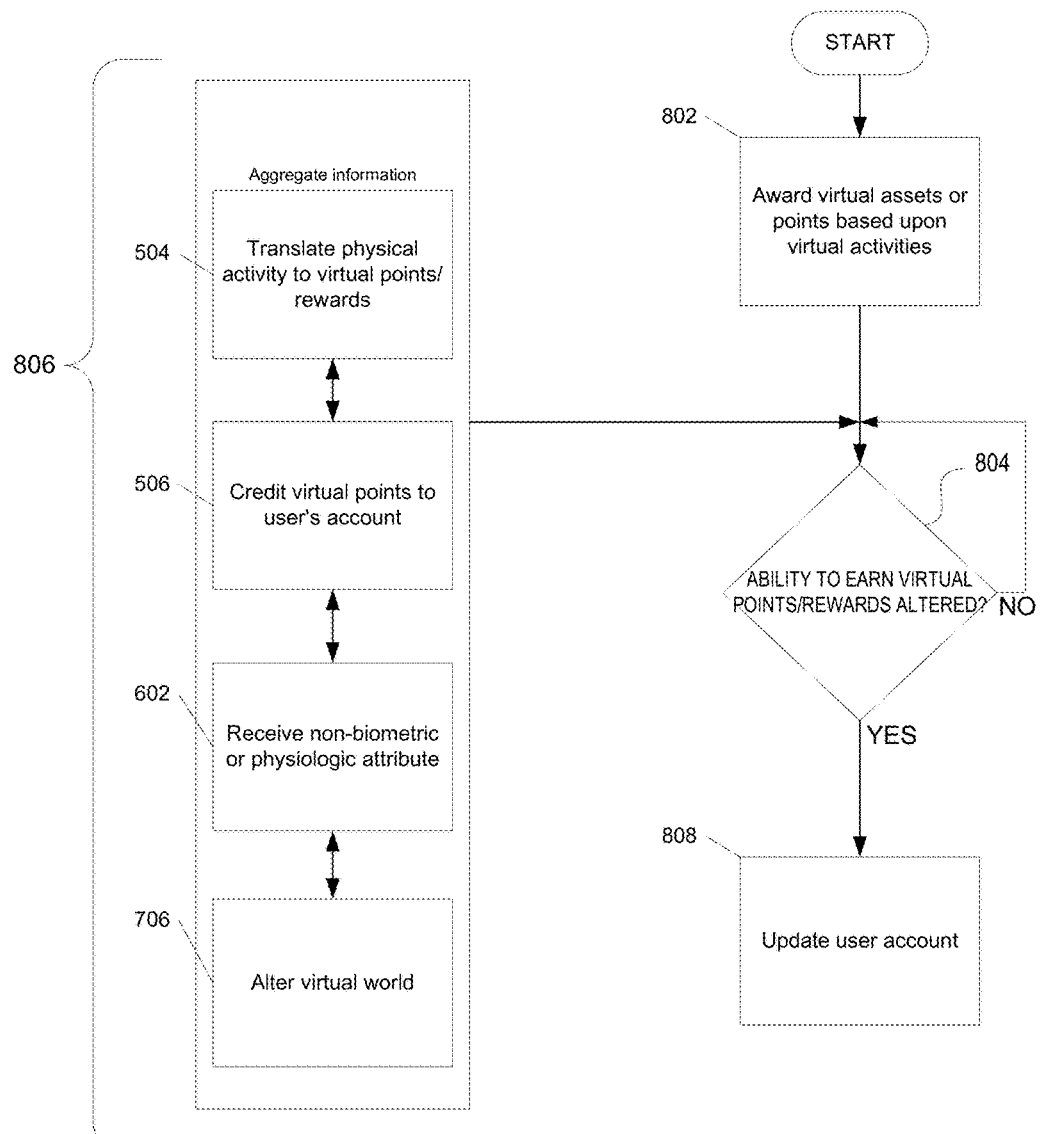
Figure 10A:
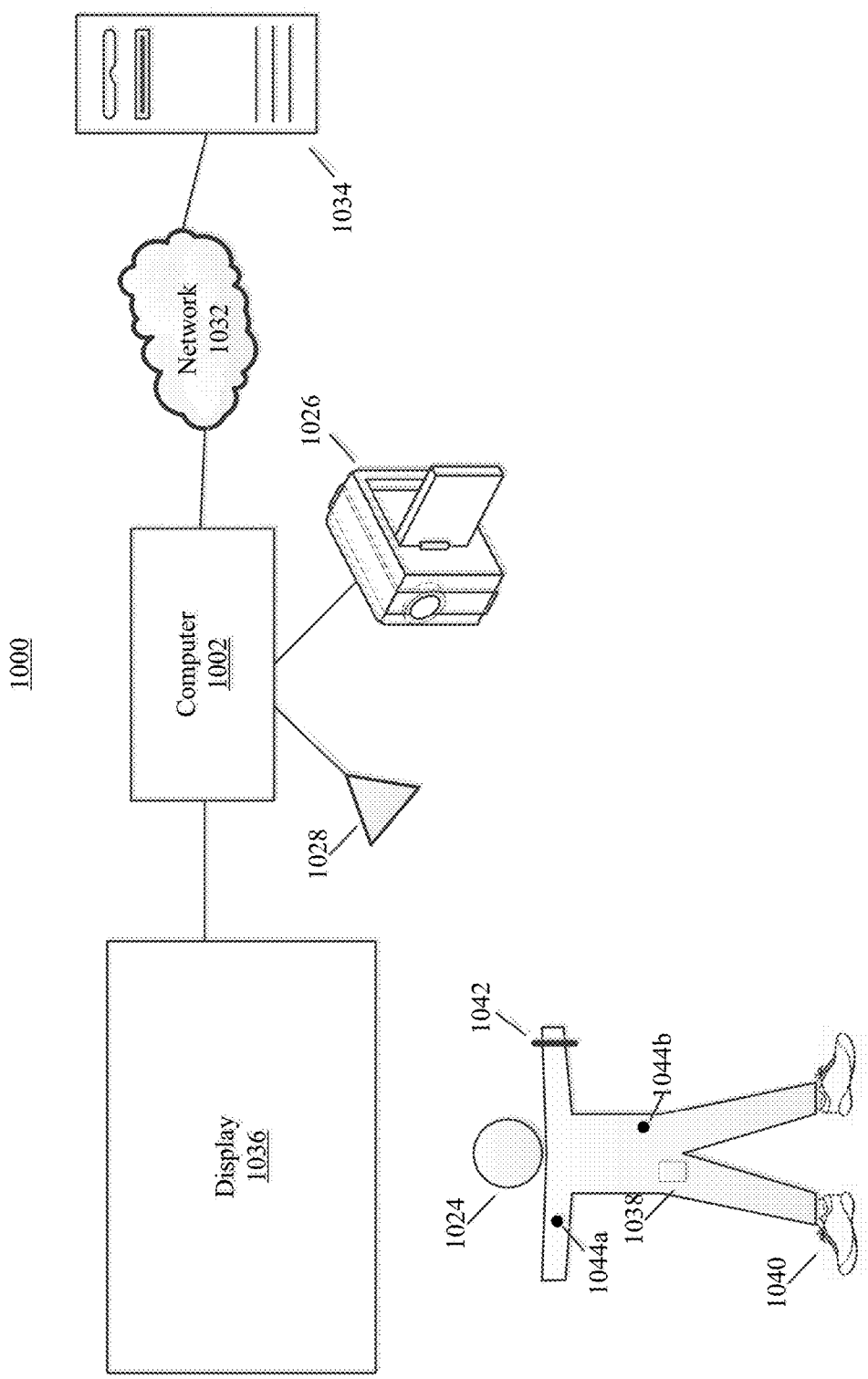
Figure 10B:
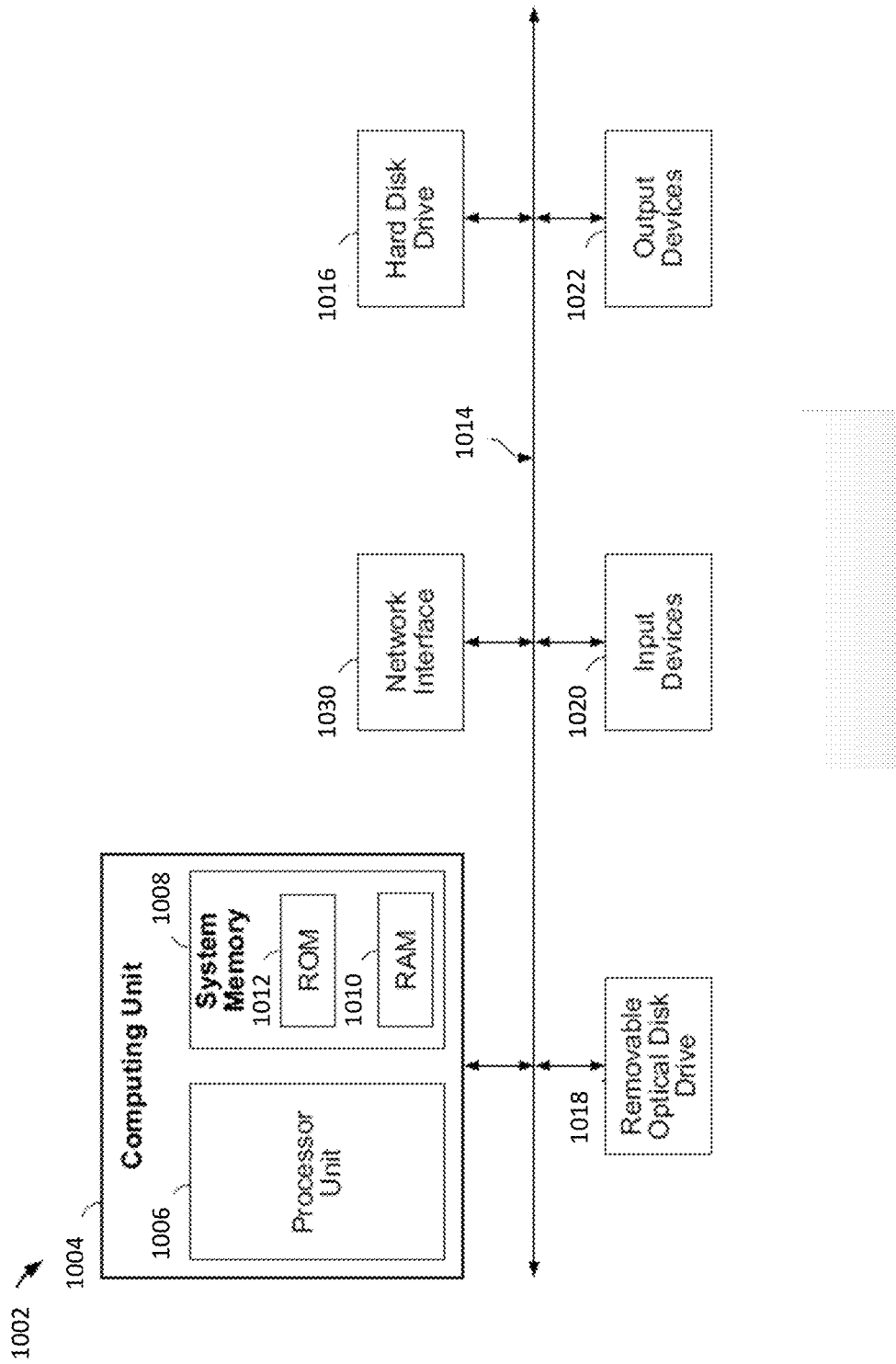
Figures 11A, 11B:
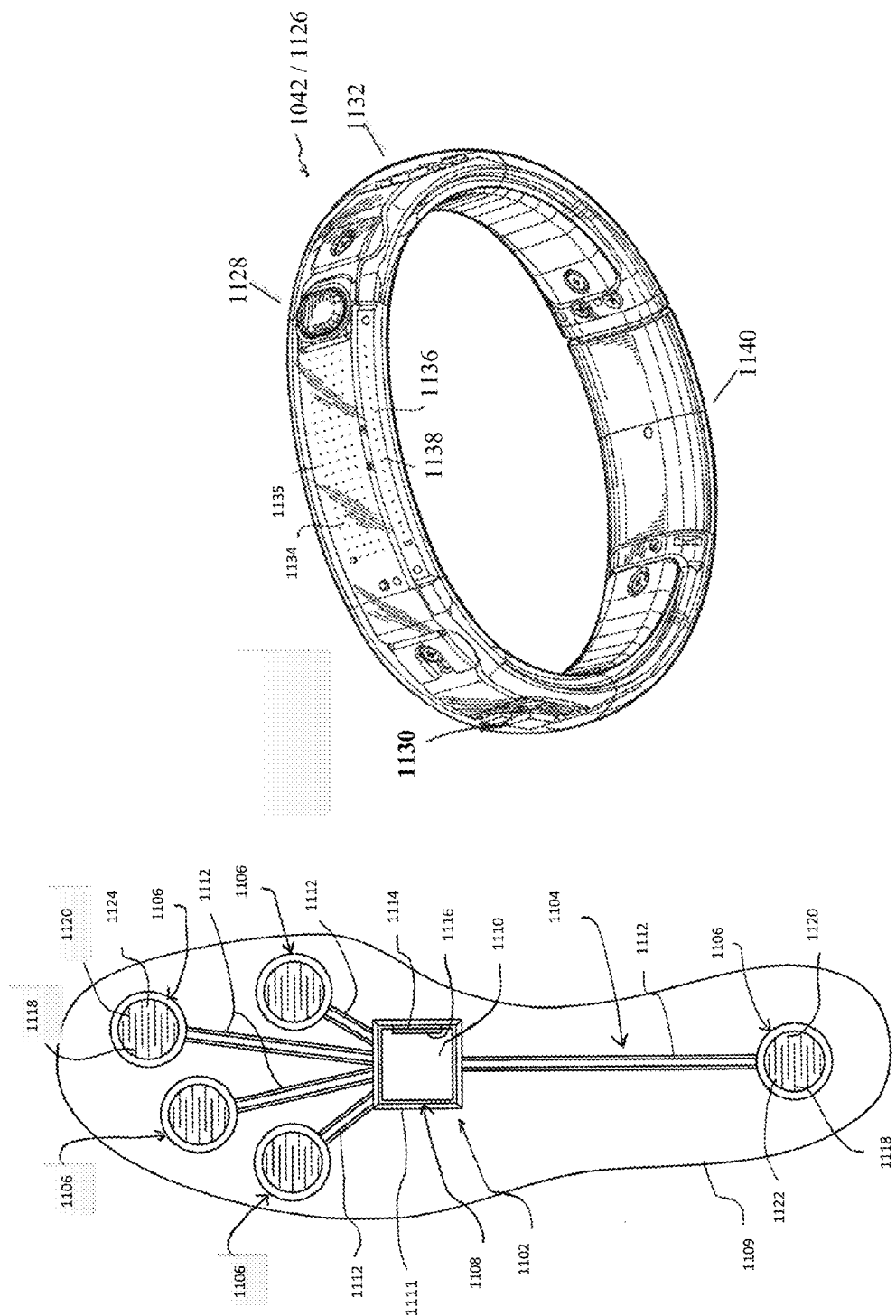
Figure 12:
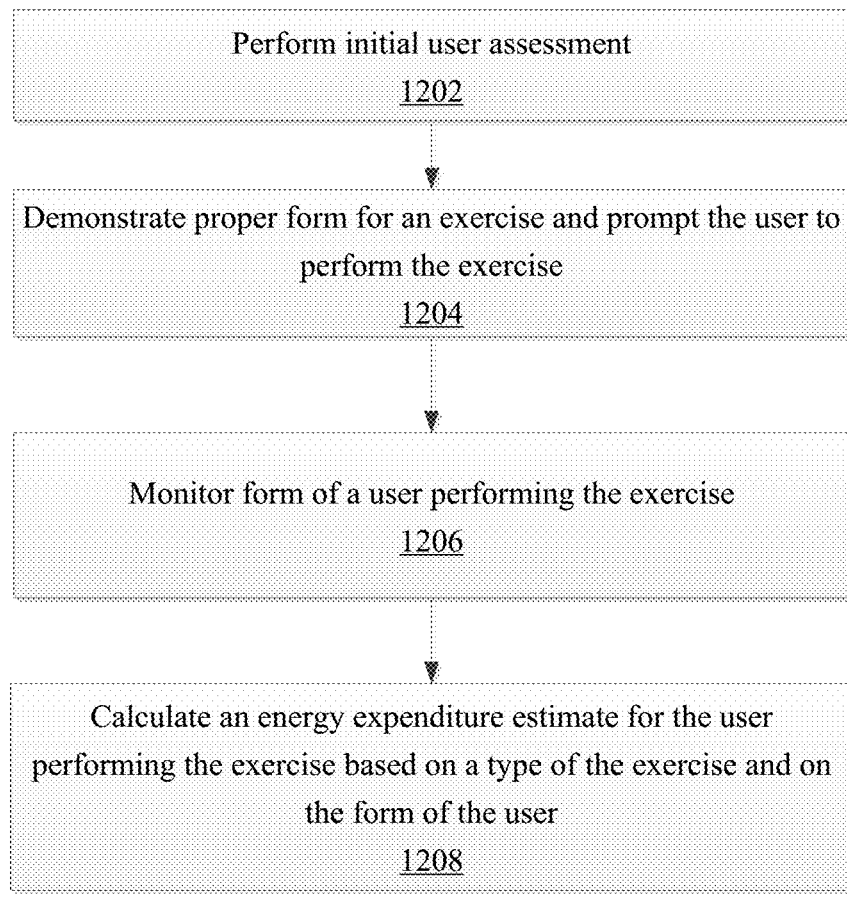
Figure 13:
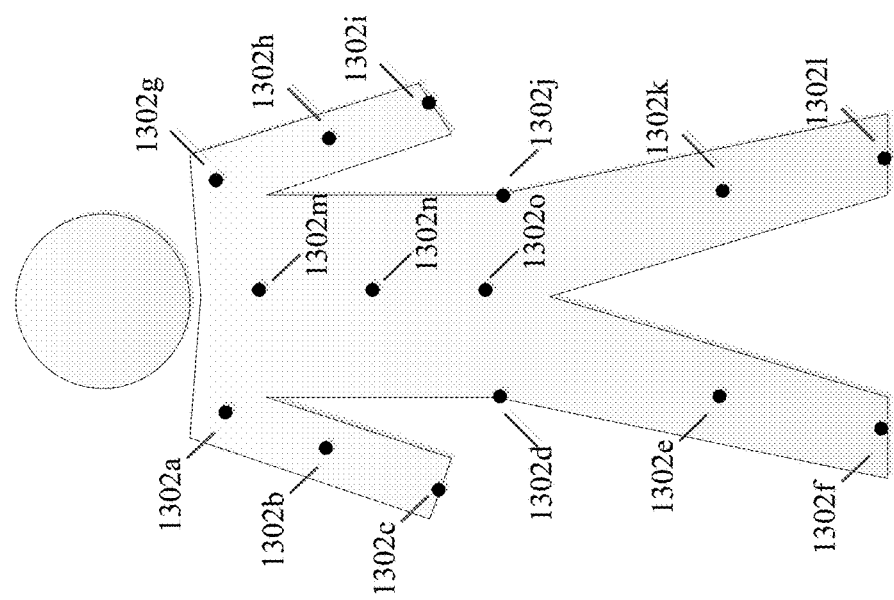

FIG. 4 shows illustrative features of an example virtual region that may be within a virtual world in accordance with various embodiments of the invention. Specifically, FIG. 4 shows an illustrative virtual region; FIG. 4B shows exemplary virtual assets that may be located within the virtual region of FIG. 4A; and FIG. 4C shows an enlarged depiction of an illustrative example shown in FIG. 4A;

FIG. 5 is a flowchart showing an exemplary method that may be utilized in the alteration of features of a virtual world in accordance with various aspects of this disclosure;

FIG. 6 is a flowchart showing an exemplary method for awarding virtual points or rewards (or adjusting the amount of points or rewards) for physical activity based upon real world variables in accordance with one embodiment of this disclosure;

FIG. 7 shows a flowchart of an illustrative method for adjusting or altering virtual assets in accordance with one embodiment of this disclosure;

FIG. 8 is a flowchart showing an illustrative method that may be used to update a user's account in accordance with various embodiments of this disclosure;

FIG. 9 shows exemplary icons that may be used in the designation of one or more illustrative reward systems in accordance with various embodiments of this disclosure;

FIGS. 10 A-B illustrate an example of a system for capturing and/or measuring physical movements in accordance with example embodiments, wherein FIG. 10A illustrates an example network configured to monitor athletic activity, and FIG. 10B illustrates an example computing device in accordance with example embodiments;

FIGS. 11A-B illustrate example sensor assemblies that may be worn by a user in accordance with example embodiments;

FIG. 12 illustrates an example flow diagram of a method for calculating an energy expenditure estimate for a user that accounts for a user's form while exercising as part of the estimate, in accordance with example embodiments; and FIG. 13 illustrates example points on a user's body for monitoring during exercising in accordance with example embodiments.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention. Further, headings within this disclosure should not be considered as limiting aspects of the disclosure. Those skilled in the art with the benefit of this disclosure will appreciate that the example embodiments are not limited to the example headings.

Figure 1:
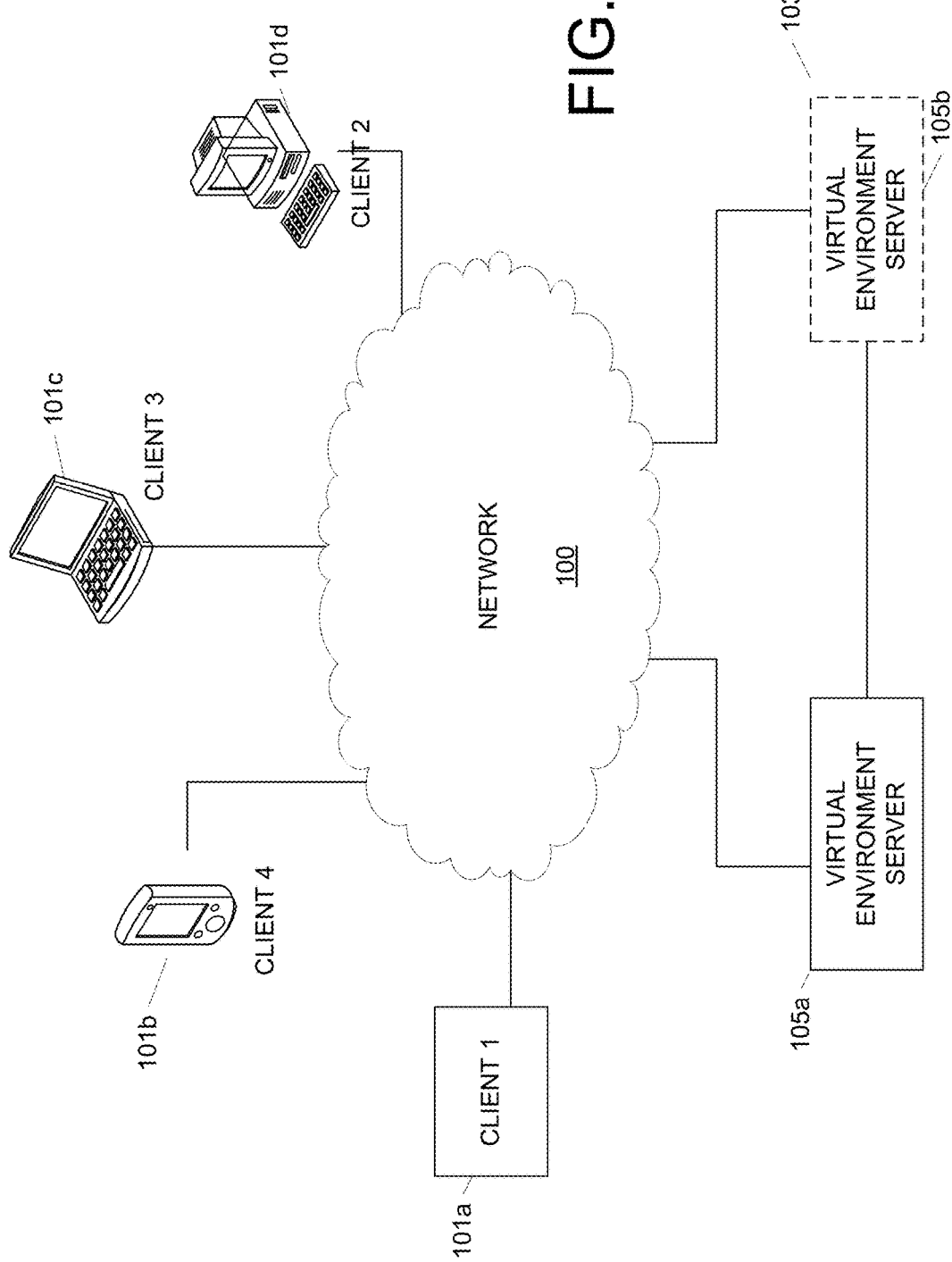
FIG. 1 depicts an illustrative network environment that may be utilized in accordance with various embodiments of the invention.

FIG. 1 illustrates an illustrative network environment that may be utilized in accordance with various embodiments. The illustrated environment of FIG. 1 may be used to transmit and/or receive electronic information during the operation of a virtual world. As seen in FIG. 1, a plurality of clients (101a-101d, collectively 101) may interact with virtual world servers (105a-105b, collectively 105). Clients 101 may include a variety of devices including any generic data processing device 101a, personal computer (PC) 101b, laptop, portable, or netbook computer 101c, personal data assistant or mobile device 101d, or any mobile communication device. Each of clients 101 may have a network adapter or transceiver that allows clients 101 to connect to virtual world servers 106 through network 100. In one example, network 100 may include an Internet Protocol (IP) based network, e.g., the Internet. Other networks may include, but are not limited to: cellular networks, cable networks, fiber optic networks, wireless networks, wired network and/or combinations thereof. Network 100 may further include one or more sub-networks such as wired or wireless local area networks (LANs) and the like.

One or more physical servers 105 may be used to run one or more instances of the virtual world server software 106. Each physical server may be a similar data processing device as clients 101, and/or may include specialized server hardware. In one embodiment, each virtual server is at the same physical location, yet in other embodiments, one or more server 105 may be located remotely from another server and operatively connected through network 100 or another network (not shown). In other embodiments, a single powerful server 105a could run multiple virtual worlds 106a and 106b, or several less powerful servers 105c and 105d could be connected in a cluster to work together to run one large virtual world 106d. As described herein 'server' is used to refer to a single instance of the server software 106, (i.e., a single stand-alone instance of the virtual world). A server does not necessarily refer to the underlying hardware server 105. However, those skilled in the art will appreciate that a single server 105a or 105b may comprise a processor and a tangible non-transitory computer-readable medium that may contain computer-executable instructions. The instructions may be executed by the processor on the server 105 or by any other processor within the environment. Computer-implemented instruction on one more non-transitory memories on server 105 may include account information, user preferences, payment information, user identification information, character definitions, and the like. Further instructions may store rules, algorithms and other data for interactions that are available in the virtual world. Exemplary hardware and software for an example client device of the network environment is shown in FIG. 2.

Figure 2:
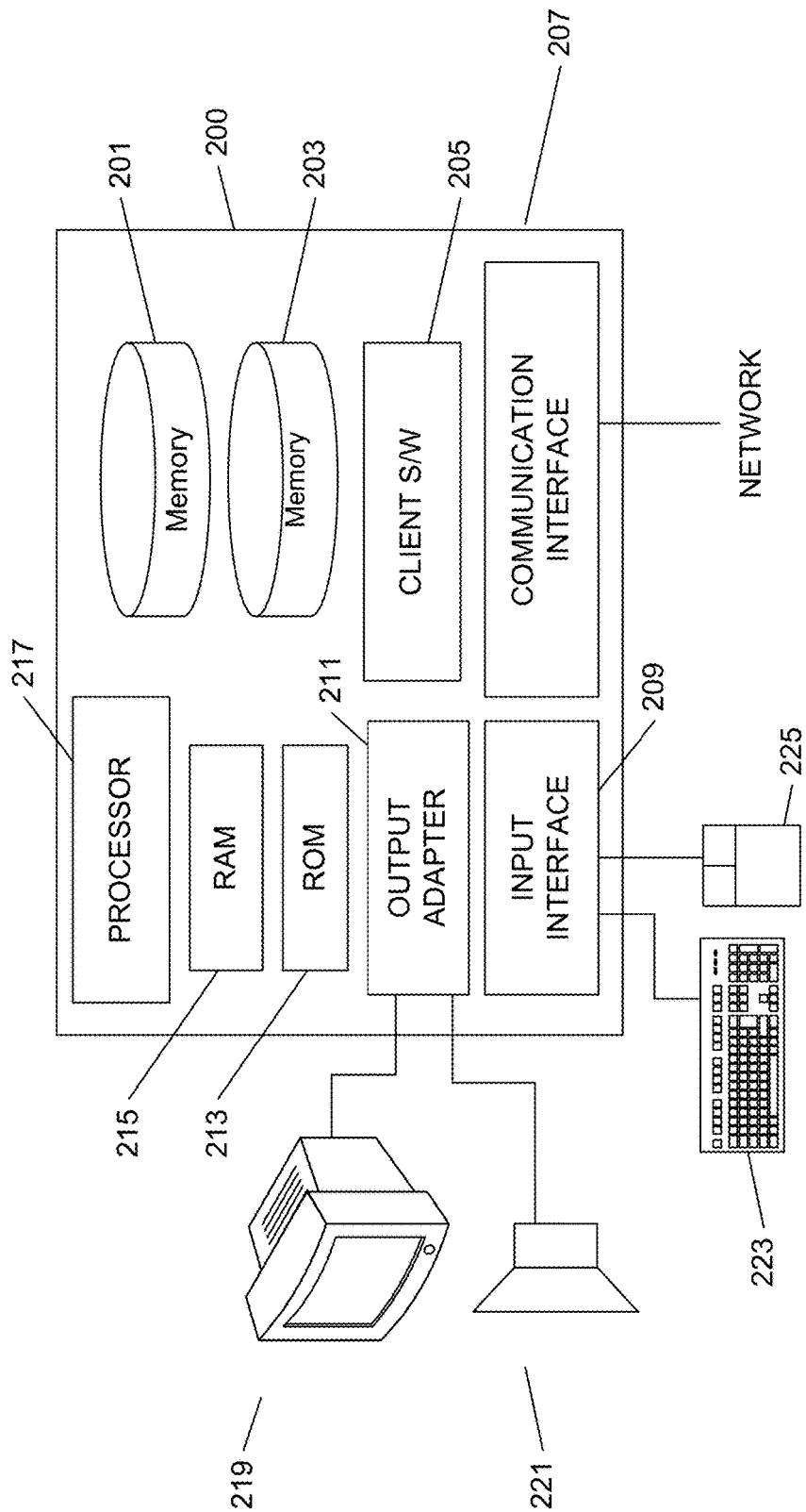
FIG. 2 illustrates an example client device that may be used in a network environment, such as the network environment of FIG. 1, in accordance with one embodiment of the invention.

FIG. 2 illustrates an example client device 200 such as PC 101d (FIG. 1) that may be used to access and interact with a virtual world provided by a virtual world server such as server 106a of FIG. 1. Client device 200 may include a variety of components and modules including a processor 217, random access memory (RAM) 215, read only memory (ROM) 213, databases 201 and 203, renderer 205, output adapter 211, input interface 209 and communication interface 207. Processor 217 may include a graphics processing unit (GPU) or a separate GPU may be included in the output adapter 211. Memory 201 may be configured to store data defining and otherwise associated with a user account, including information regarding an avatar used by a user of device 200 to explore and interact with a virtual world. Avatar information may include avatar characteristics (e.g., strength, skin color, eye color, hair length, height, weight, intelligence), avatar position/location information, objects associated with the avatar (e.g., inventory, clothes, fitness equipment, accessories) and the like. Avatars will be explained in further detail below, including in reference to FIG. 3. Memory 203, on the other hand, may be configured to store data for defining and generating the environment in which the avatars exist. For example, memory 203 may store texture maps for rendering a fitness arena, a hiking trail, and the like. In another example, memory 203 may store simulated weather data, accessible versus non-accessible areas, colors, interactive components of the world (vs. non-interactive components), data defining inanimate objects existing in the world, data defining computer controlled characters and the like. In one embodiment, memories 201 and 203 may be a single, non-transitory computer-readable medium. Each memory 201, 203 may or may not include a database to store data or include data stored in RAM memory, accessed as needed by the client software. Data associated with an avatar or the virtual world may be communicated between client device 200 and a virtual world server (such as server(s) 105) through a transceiver or network interface, such as communication interface 207. For example, avatar positions, attributes and status may be updated or environments may be changed by communicating such data through interface 207.

One or more tangible, non-transitory computer-readable mediums, such as medium 201 or 203 may be configured to contain client software (graphically shown as software 205). The world and the avatars may be rendered by client software 205 and subsequently sent to output adapter 211 and display 219. The client software 205 may, in one or more arrangements, be configured to generated three dimensional (3-D) models of a virtual world and components thereof as well as the avatar corresponding to a user. A user may control the avatar and interact with the world through input interface 209 using various types of input devices including keyboard 223 and mouse 225. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored in memories, 201, 203, RAM 215, ROM 213 or a combination thereof. Other types of memory may also be used, including both volatile and nonvolatile memory. Software 205 may be stored within RAM 215, ROM 213 and/or databases 201 and 203 to provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or databases 201 and 203. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
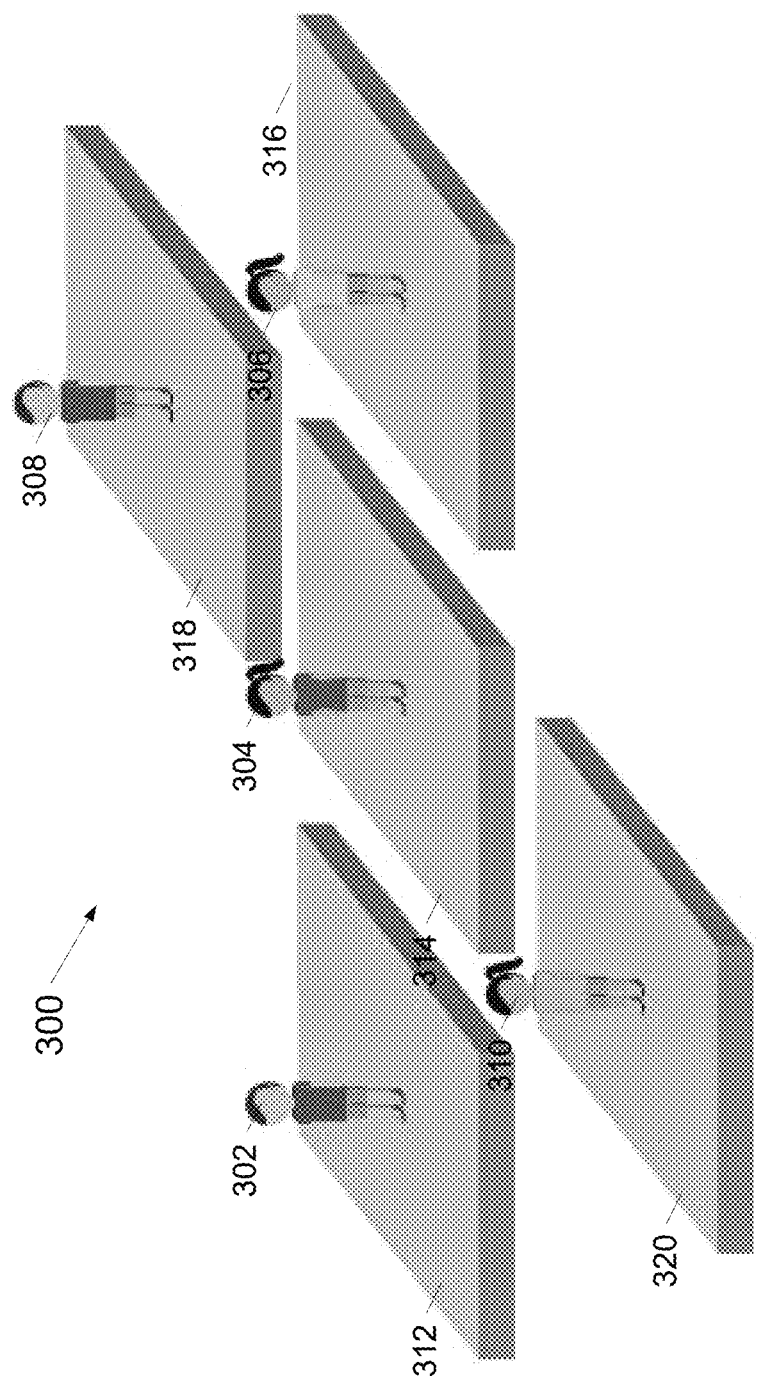
FIG. 3 shows an exemplary simplified virtual world to illustrate various aspects of this disclosure.

Aspects of this disclosure relate to rewarding users of an electronic game for real-world physical activity and/or movements. In various implementations, the electronic game may comprise or otherwise relate to an online world (such as a "Virtual Universe" or a "Virtual World"). As used herein, the terms "Virtual Universe" or "Virtual World" are synonymous and refer to any electronic environment in which one or more individuals (or entities) may interact through virtual representations. A virtual world may be a graphically rendered or graphically simulated environment in which many users can interact with each other, against each other, for either a common purpose or a competing purpose. FIG. 3 shows a simplified virtual world 300 to illustrate various aspects of this disclosure. Users, which may be individuals and/or entities, may be represented through customized graphical representations, such as avatars (i.e., avatars 302, 304, 306, 308, and 310). An avatar 302 may be a graphical representation having one or more features of the specific user. For example, a user of virtual world 300 may be able to select one or more features of the avatar 302, including, but not limited to: facial features, size, body shape, clothing, and/or accessories. Thus, avatars (i.e., avatars 302, 304, 306, 308, and 310), may serve as a virtual identities for the respective users of virtual world 300.

In accordance with various embodiments, an account of each user (or entity) using virtual world 300 may be associated a "virtual region." As used herein, the term "virtual region" refers to a virtual or graphically-depicted 3-dimensional space within a virtual universe or world 300. As seen in FIG. 3, each avatar 302-310 may be associated with a specific virtual region (see, e.g., regions 312, 314, 316, 318, 320 respectively). In certain embodiments, various virtual regions 312-320 may be traversed by other user's avatars 302-310. For example, avatar 302 may be permitted to leave region 312 and traverse onto one or more of regions 314-320. Yet in other embodiments, users may limit the actions of other avatars on their specific virtual region. For example, the owner of region 314 may prevent avatar 302 from travelling onto region 314. In another embodiment, avatar 302 may be permitted to travel onto region 314, however, could be prevented from conducting certain activities on region 314. For example, avatar 302 may be able to travel through region 314 to region 316, however, may not alter or utilize certain items that are associated with region 314. Further aspects of user interactions will be described later in this disclosure.

Virtual world 300 may be graphically depicted to resemble a real-life location, a science fiction environment, a fantasy environment, or any other setting on as desired. In this regard, one virtual region, such as region 302, may have an entirely different environment than a second region, such as region 304. In one embodiment, each avatar 302-310 may control one or more virtual features of their respective virtual region 312-320. The orientation of virtual regions (such as regions 312-320 of FIG. 3) may be fixed, such as a physical landmass. Yet, in other embodiments, the orientation and/or placement of regions 312-320 may be relative. For example, it may be different based upon a user's preference, settings, or rule-based logic. In one embodiment, the user of avatar 302 may be "virtual friends" with the users of avatars 304-310, or otherwise have account settings indicating that they would like to be associated with those users. Therefore, virtual regions 312-320 of those users may be visually depicted as being in close proximity to avatar's 302 for one or more users of the virtual world 300. As another example, the user of avatar 312 may have a different setting (such as not "friends" with or otherwise not associated with avatar 302), therefore, at least to the visual indication provided to the user of avatar 312, avatar 302 as well as its region 312 may not be visually depicted in the visual world 300.

Those skilled in the art will readily appreciate that world 300 is a simplified depiction that is shown for illustrative purposes only and other virtual worlds may be more complex without departing from the scope of this disclosure. Further, there may be many more regions found in a typical virtual universe, or even only one region in a small virtual universe. Further, like the real world, each virtual region 312-320 within virtual universe 300 may comprise landscape having either alterable or unalterable features. Examples of illustrative features are shown in FIG. 4.

FIG. 4A shows an illustrative region 402 that may include one or more alterable features. In one embodiment, region 402 may be substantially identical to region 302 of FIG. 3. As seen in FIG. 4, region 402 comprises virtual content, such as an illustrative arena 404, gym 406, buildings 408, and trees 410. In certain embodiments, region 402 may be preconfigured, such that the orientation and/or placements of one or more objects of virtual content may be positioned for the user's first use. In other embodiments, a user may be able to move or alter the arrangement (including removing) of one or more objects. Those skilled in the art will appreciate that content 404-410 are shown for illustrative purposes only and that other content, such as natural elements (e.g., rivers, mountains, lakes, etc.), stores, sporting structures, parks, and the like may be created by administrators or residents of the universe that are represented by avatars. Further, as will be explained later in this disclosure, the performance of physical motions in the physical world (i.e., the real world) as well as virtual activities within virtual world 300 may permit the alteration of one or more features of a region, such as region 402.

In certain embodiments, virtual world 300 may provide a simulated environment in which many users interact with each other, against each other, for a common purpose, or for a competing purpose. This may be accomplished through interactions between avatars (such as avatars 302 and 304) as well as the interaction of an avatar with virtual content, such as sporting arena 404 or hiking trail 412. For example, users may navigate (such through the electronic transmission of one or more user inputs) their respective avatars to travel and interact with each other within illustrative virtual world 300. For example, an avatar, such as avatar 302, may be rendered and placed within virtual world 300 at a specified position. Using controls as described above with respect to FIG. 2, a user may move their respective avatar 302 to modify avatar 302's position. For example, the user may move avatar 302 closer to arena 404 or closer to gym 406. Further, in certain embodiments, arena 404 and/or gym 406 (as well as one or more other objects within region 402) may be interactive. That is, a user may transmit user inputs to control his or her avatar 302 to, for example, open the doors of gym 406 to enter the gym 406 and be presented a visual depiction of additional objects, such as gym equipment within the gym 406. FIG. 4B shows exemplary gym equipment (see, weights 414 and treadmill 414) that may be visually presented to a user upon entering gym 406. Although some aspects of virtual region 400 are illustrated as two dimensional (2-D), those aspects may also be generated as 3-D objects with, optionally, various texture and colors.

Aspects of the application relate to an altering one or more features of an online game comprising a virtual world, such as virtual world 300 shown in FIG. 3. FIG. 5 is a flowchart 500 showing an exemplary method that may be utilized in the alteration of features of a virtual world in accordance with various aspects of this disclosure. In one embodiment, changes or opportunities to change features of virtual world 300 may be based on real-world physical activity of a user associated with an avatar (such as avatar 302-310). Those skilled in the art will readily appreciate that the ordering of flowchart 500 or any other flowchart disclosed herein is merely for explanatory purposes unless dictated otherwise. Further, it is not a requirement that each block or decision within a flowchart be executed.

In one embodiment of flowchart 500, block 502 may be implemented to receive electronic data representing a user's physical activity. Physical activity may be measured across several disparate systems and devices. For example, a first sensor may be worn by a user and measure the user's total movements throughout their daily activities while a second sensor may be associated with an exercise device, such as a treadmill, and be may measure movements, time spent, and/or performance of a user on a particular machine or type of machine. Example systems, sensors, and methods that may be utilized in the collection or reception of physical data are provided later in this disclosure including FIGS. 10-12. As explained throughout this disclosure, inclusive of at least FIG. 10, athletic performance monitoring device(s) may be configured to detect and collect information from multiple sensors.

Physical activity or movement by the user in the real-world (such as received at block 502) may be converted or otherwise translated into virtual points or rewards (see, e.g., block 504). In this regard, in accordance with certain embodiments, physical activity may be measured by energy expenditure, such as for example, caloric expenditure. Example embodiments of calculating energy expenditure are discussed in relation to FIG. 13. In this regard, aspects of this disclosure relate to methods and systems that may reward players with virtual goods or services for their physical activity in the real world. In one embodiment, points may be awarded on a numeric scale. Methods and systems may permit virtual points to be spent or transferred by a user to: obtain new virtual content for their virtual region, grant virtual points to another user, improve functionality or the appearance of their virtual content or region, as well as alter the usability of the virtual world. Those skilled in the art with the benefit of this disclosure will readily appreciate that these are merely examples and other virtual uses are within the scope of this disclosure. In yet other embodiments, a user may be able to obtain physical goods or service with one or more types of points.

Certain embodiments may convert physical actions to a plurality of virtual point systems. For example, a first point system may award the user for a first type of user activity while a second point system rewards the same user for different actions or activity. For example, if at block 502, it was determined a user ran 5 miles, then certain embodiments may credit that user's account or otherwise reward that user with a predetermined quantity of points for each mile. The reward may be non-linear such that a user who runs 5 miles gets 10 times the reward than if they just ran 1 mile. In one embodiment, a GPS or other position locating device may track a user's movement and points or awards may be provided based upon the user's movement.

As will be appreciated by those skilled in the art, participating in other activities, such as team sports, may involve running. Thus a user may be awarded "miles" for running during the sporting activity, as well as being rewarded for participating in the sporting activity. The reward for the sporting activity may be under the same point system as the running reward, or in other embodiments, the points may be provided under a different point system. Thus, in certain embodiments, a user may be compensated under two virtual point systems for the same virtual world for a single performance (i.e., participating in a football game). Illustrative examples of possible point systems are provided below in FIG. 9.

In other embodiments, rewarding of time may consider the time spent by a user conducting certain activities or performing certain motions. Thus, a quantity of time a user spends conducting a physical activity or movement may be utilized in determinations of rewards. In one embodiment, the award (such as with virtual points or virtual assets) may be directly related to the quantity of time a user spends conducting the physical activity. For example, in one embodiment, a user may be awarded 5 points for every 20 minutes of playing in a specified team sport. In yet other embodiments, time may be utilized in conjunction with other criteria. In one embodiment, a reward may only be given if a physiological and/or biometric parameter reaches a certain threshold. For example, in one embodiment, a user's heart rate may have to be retained above a threshold for a predetermined amount of time to receive the reward. In another embodiment, a user must have to physically travel a predefined distance during a window of time to receive a quantity of points. In one embodiment, a location positioning sensor (such as a GPS) may track a user's physical movement throughout the day, regardless whether the user is at a gym or playing in an arena. Certain embodiments may take one or more physiological or biometric parameter readers from the user from a sensor operatively connected to the user. Such sensors may be worn to a user, attached to apparel, such as a watch, hat, shoes, or the like, or incorporated as part of an electronic device, such as a mobile telephony device, that may be carried by the user. Although the term "reward" has been utilized herein, certain embodiments, may distinguish between rewards given for a first physical activity and a second physical activity. Thus, embodiments envision the utilization of multiple rewards for different virtual goals.

At block 506, virtual points may be applied to the user's virtual world account. As will be appreciated by those skilled in the art, some point values may be stored on a computer-readable medium, such that the user may selectively "spend" the points like a virtual currency during their usage of the electronic game. Yet, in other embodiments, upon the points being associated with a specific account of the virtual world 300, certain features will be automatically unlocked. For example, hiking trail 412 may be unlocked or available for placement by the user in their virtual region upon running a predefined distance. In another embodiment, if a user physically runs 5 miles within a twenty-four hour period, they may be automatically rewarded with a reward of a virtual running track for their virtual region.

FIG. 4C shows some examples of additional illustrative rewards that may be provided to a user in accordance with various embodiments. In certain embodiments, users may be rewarded with the ability to modify or improve virtual objects. For example, gym 406 may be modified by replacing it with a bigger structure, such as gym 418. In another embodiment, a user may be rewarded by permitting them to conduct virtual activities in the gym 406 that they previously could not perform before the award. For example, gym 406 could be modified to include an indoor track, or a rock-climbing structure. In yet another embodiment, a trophy or monument may be placed in the gym 418 or any other structure or portion of their virtual region. Yet in other embodiments, the user could be rewarded with a score board, such as scoreboard 405 for arena 404.

FIG. 4C shows an enlarged depiction of an illustrative example of scoreboard 405. In certain embodiments, features of scoreboard may be obtained or otherwise activated upon being awarded a virtual reward. As discussed later in this disclosure, other embodiments may provide scoreboard 405 or other virtual assets as a reward for completing a challenge, such as a competitive game that requires physical activity from at least two participants. In yet another embodiment, scoreboard 405 may virtually display real world activity, such as the result of the sporting or physical activity that was the result of them being awarded the reward. In another embodiment, it may display other results of the user's past physical performance. In yet another embodiment, scoreboard 405 may provide updated or live data from a user's physical activity.

Scoreboard 405 is merely an example, and those skilled in the art with the benefit of this disclosure will appreciate that other virtual rewards may display data from the user's (or other user's physical activities. For example, vehicle 420 may virtually display physical data, such as data display 422. Data display may be provided on the vehicle or, as shown in FIG. 4C, it may be connected to it, such as being dragged behind it in a banner-like form. In one embodiment, vehicle 422 may travel around the user's virtual world advertising the user's physical accomplishments. In other embodiments, vehicle may travel to other user's virtual regions to gloat about that user's accomplishments. In one embodiment, vehicle 420 may travel to another user's virtual region to deliver a challenge to perform a physical activity.

As discussed above, virtual displays, such as data display 422, may provide virtual indications of a user's real-world physical data. Further aspects of this disclosure allow for virtual representations of physical activity. For example, if a user is physically running in the rain, then their virtual region may be updated to show their avatar running in the rain. If the user is swimming, their virtual avatar may be shown swimming in a body of water, such as a pool or in a lake. Likewise if the user is playing in a team event, a crowd may be shown at arena 404.

In other embodiments, a reward or accumulation of points may include making the user's virtual region more popular or attract better sporting teams. For example, arena 404 of FIG. 4A may be upgraded to hold more people, attract better teams, or have improved facilities. In other embodiment, a virtual representation of a well-known athlete can visit their virtual region, and use the virtual assets (i.e., such as gym 406 or arena 404). In certain embodiments, information regarding these rewards may be broadcasted other individuals, both through the virtual world and the real world.

Certain aspects relate to awarding virtual points or rewards (or adjusting the amount of points or rewards) for physical activity based upon real world variables. Turning briefly to FIG. 6, block 602 may be implemented to determine a non-physiological or biometric parameter of the real-world. For example, in one embodiment, a user's location may be obtained and utilized to determine one or more aspects of the weather. Often, adverse weather (including rain, snow, or excessive heat) discourages individuals from exercising. Thus, detection of the weather conditions for a specific user may be utilized to determine or adjust an award and/or establish a previously non-existent point or reward opportunity. (See, e.g., block 604, and adjust award or points for conducting exercise).

In other embodiments, virtual rewards may be modified or created to mimic a real world feature, such as a feature deduced or detected from block 602. In this regard, one or more real-world variables may be utilized to provide new (or adjust existing) virtual points or rewards that are associated with real-world structures or locations. For example, block 606 may be implemented to detect real-world attributes to reward a user with a virtual replica or representation of a structure or location. In one embodiment, a GPS (or other position locating device) may determine a user's physical location, such through block 602 and/or block 502. For example, a user who visits their favorite football stadium may be rewarded with a virtual replica of that stadium to place on their virtual region. For example, existing arena 404 may be modified or replaced with a new arena having one or more features of the actual physical structure or location.

In one embodiment, the location may include a natural structure, such as a mountain; thus, the user will may be awarded with a virtual mountain. In one embodiment, the virtual asset (i.e., mountain) may be associated with physical attributes of the actual physical mountain. For example, if the user is detected on the summit of a 5,115 foot mountain, then their virtual mountain may be indicated to be about that tall. Yet in other embodiments, it may be identified as being correlated to the physical structure or location of the user.

In other embodiments, one or more real-world variables may be utilized to provide new (or adjust existing) opportunities to earn virtual points or rewards (see, e.g., block 608). For example, if the user is visiting a mountainous region, a new challenge to hike a virtual mountain trail may be provided or an existing challenge to hike a mountain may be associated with an increased reward or point amount. In certain embodiments, the new activity or challenge may be associated with a new virtual content structure or object, such as one awarded as part of block 512 of FIG. 5.

It goes from the foregoing that physical activity outside the game may be correlated with conducting certain activities within the virtual world. Unlike prior art methods, certain aspects of this disclosure do not require a user to be positioned in front of a display during the physical activity. For example, the user may be hiking up a physical mountain, and their physical activity during that event may be correlated to hiking up their virtual mountain or other virtual structure. In another embodiment, the user may be running or walking during an actual sporting event, such as like during a soccer game or football game, and their physical activity during that event may be correlated to presenting an avatar playing a corresponding virtual sporting event.

Goals, objectives, opportunities, and rewards may correspond to physical landmarks or location-specific items. For example, the Statue of Liberty, the Empire State Building, Museum of Modern Art (MoMA), and/or a "Big Apple" may all be considered symbolic of or particularly representative of New York City. Thus, in accordance with certain embodiments, a real-world geographic location may be selected. It may be selected upon the user's detected physical location, a user input, the style of their virtual region, rules of an objective, or any other reason. In one embodiment in which New York City is the geographic location, an objective may relate to the Empire State Building. The specific objective may be one of many objectives the user may select for that geographic area. Yet in other embodiments, other objectives may be locked and/or hidden until a required number of other objectives have been completed, an amount of athletic activity has been performed and/or an immediately preceding objective has been completed.

The objective relating to the Empire State Building may require the user to burn a target number of calories, a target number of steps, a distance requirement or a combination thereof among other criteria for the successful completion. A virtual indicator, such as for example, scoreboard 405 or data display 522 may virtually indicate progress toward completing the goal. The progress may be based on steps or calories burned already completed in excess of the previous goal. Exemplary systems and methods are described in U.S. patent application Ser. No. 12/855,304 filed Aug. 12, 2010, the contents of which are hereby incorporated by reference in their entirety for any and all non-limited purposes.

As would be appreciated by one skilled in the art with the benefit of this disclosure, one or more real-world variables may be combined. For example, temperature and location data may both be used, either simultaneously or separately in any determinations, including any of the processes described in relation to blocks shown in FIG. 6 (alone or in combination with other processes, such as those described in relation to FIG. 5). Further, although certain embodiments have been described in relation to non-biometric or physiological variables, other embodiments may utilize biometric and/or physiological variables in any systems and methods disclosed herein. In certain embodiments, at least one biometric or physiological variable may be utilized in conjunction with one or more non-biometric parameter. For example, in one embodiment, block 508 (which may be the same as or similar to block 602) may be implemented to receive non-biometric or physiological data. In one embodiment, at least one non-biometric/physiological attribute may be combined with data representing a user's physical activity (such as through block 502 of FIG. 5). One or more parameters received in any of blocks FIG. 6 may be provided as an input to 502 as shown in the exemplary embodiment. Yet in other embodiments, information gathered at any process shown in FIG. 6 may be utilized in other processes, including at both blocks 504 and 506, as well as any other processes.

Further embodiments may remove, destroy, or alter virtual assets based upon a user's inactivity. FIG. 7 shows a flowchart of an illustrative method for adjusting or altering virtual assets in accordance with one embodiment. In one implementation, block 702 may be implemented to receive electronic data representing a user's activity. In certain embodiments, block 702 may comprise one or more systems and/or methods of block 502 of FIG. 5. For example, data collected at block 502 may include motion data that indicates a user is running. A user's activities may be measured across several disparate systems and devices. For example, a first sensor may be worn by a user and measure the user's total movements during the day and a second sensor may be associated with an exercise device, such as a treadmill, may measure a user utilizing a particular machine or type of machine.

Yet, in other embodiments, block 702 may consist of one or more processes entirely isolated from block 502 or other processes described herein. In one embodiment, data received at block 702 may include timing data indicative of inactivity of the user. For example, certain systems may utilize a sensor to detect motion of the user or portions thereof. Timing data may be associated with the sensor data that is indicative of a pace, acceleration, force, and/or any other attributes.

At block 704, it may be determined whether the user was inactive. As would be appreciated by those skilled in the art, the determinations of block 704 as well as any other method described herein may occur, before, during, or after one or more methods described in any other flowchart, including at least FIGS. 5 and 6. In one embodiment, block 704 may comprise a determination whether the user was active enough to trigger at least one threshold. In one embodiment, block 704 may consider whether one or more thresholds were met during a time period. The time period may be fixed, such as within a 24-hour period, yet in other embodiments, the time period may be a relative and/or rolling time period. The time period may be triggered upon the occurrence of an event, such as an event in the real world or the virtual world. In certain embodiments, one or more thresholds may be distinct and separate from any thresholds or requirements utilized to earn points or rewards in the virtual world (such as disclosed in FIG. 5). As an example, an exemplary system may reward the user for running 10 miles within a 24 hour period (see, e.g. block 504 of FIG. 5), however, it may be determined that the same user was "inactive" for a week because they did not run at least 50 miles that week. Thus, although the user may have been "rewarded" for running at least 10 miles for 2 days that week, one or more processes at block 704 may deem that user inactive that week because they did not run at least 50 miles for that week. In another embodiment, they may have met all the thresholds for running, however, failed to meet other criteria set forth in block 704 and, thus be deemed "inactive" for at least one criterion. Those skilled in the art will readily appreciate that the determination of threshold and timing of activity measurements is not limited to the above examples.

Block 706 may be implemented to alter the virtual world 300 based upon an indication of inactivity. In one embodiment, that user's specific virtual region is altered. In another embodiment, other regions, such as a teammate or friend's region may be altered. In one embodiment, inactivity may be determined from one or more thresholds that may have been exceeded (or failed to have been exceeded) from block 704. In one embodiment, the points deducted or the alteration to the user's virtual world may be scaled based upon the level of inactivity. For example, a user who fails a goal by 10% may not get as many points deducted as a user who is 25% deficient. The scale is not required to be linear. Other alterations besides deduction of points are within the scope of this disclosure. For example, a well-known celebrity athlete may come and destroy their gym (i.e., gym 406) if the user doesn't conduct a certain amount of physical activity or a certain type of activity. The alteration may include the complete destruction of the asset, however, in other embodiments, it may be partially destroyed. In one embodiment, certain features or attributes of a virtual asset may be removed. For example, a swimming pool may be removed from the gym 406. In another embodiment, an arena (such as arena 404) be downgraded to hold less people, attract less known sports teams, or otherwise altered. In one embodiment, real-world inactivity in a specific sporting event may cause a virtual team associated with the virtual region to lose a game or otherwise perform less athletically. In this regard, if the user fails to conduct certain soccer drills, their virtual soccer team (who may play virtual games at arena 404) may perform poorly, attract fewer fans, lose games, or otherwise be adversely affected.

Thus, in accordance with certain aspects of the invention, multiple for designating experience points in accordance with one embodiment of the invention. In certain embodiments, experience points may be virtual points that permit a user to reach certain levels or milestones in the virtual game. For example, in one embodiment, a certain asset, such as an Olympic-sized virtual swimming pool may only be available upon the user accumulating a certain number of experience points or reached a certain level. In this regard, points may be for performing virtual activities, such as improving or maintaining a virtual region.

In another embodiment, virtual rewards or points may comprise a virtual currency. Exemplary coin icon 904 shows an illustrative icon that may be used to designate a virtual currency. Virtual currency 904 may be earned through virtual activities within the virtual world. In one embodiment, a player may earn virtual currency from virtual actions of others. For example, looking back to FIG. 3, a first user or player may control avatar 304 to utilize the virtual region 312 of a second player (who is associated with avatar 302). For example, virtual region 312 may comprise a world-class gym, thus if avatar 304 uses the gym of region 312, then the first player may be awarded a quantity of virtual currency, such as currency 904. In one embodiment, players may help each other stay motivated by assisting the accumulation of virtual currency. Those skilled in the art will readily appreciate that other points/rewards may also be transferred like currency.

Further embodiments may utilize a virtual energy system. In one embodiment, an energy system may be based on a real-world attribute. For example, a predetermined quantity of energy may be awarded for every predefined interval of time in the real world. Icon 906 is an exemplary icon that may represent virtual energy in accordance with one embodiment of the invention. In one embodiment, building virtual structures requires virtual energy.

In other embodiments, a user may receive points or rewards as a gift. For example, another player may give a gift of energy points, currency, experience points, or any other source of virtual rewards or points. In one embodiment, receiving messages of encouragement or motivation may provide a source of points or rewards. In other embodiments, transmitting motivational or encouraging messages may provide a source of points or rewards. In this regard, aspects of this disclosure relate to systems and methods for permitting users to transmit virtual gifts and other items to other players. In one implementation, the transfer of gifts may encourage social interaction in the virtual world as well as the physical world.

FIG. 8 is a flowchart showing an illustrative method that may be used to update a user's account in accordance with various embodiments. In one implementation, virtual activities (Such as those discussed above as well as those to be described later in this disclosure) may result in the awarding of virtual points. Decision 804 may be implemented to determine whether the user's ability to earn virtual points or rewards has been altered. For example, upon awarding points (i.e., experience points) to a user based upon virtual activities, decision 804 may be implemented to see if a user has unlocked a new asset, or can complete a new objective. As discussed above, completion of certain physical activities may unlock further abilities to earn virtual points/rewards. Likewise, the user's failure to conduct certain actions may remove an ability to earn points/rewards. Thus, decision 804 may consider information from a plurality of sources. In on embodiment, block 806 may be implemented to collect or aggregate information. The information collected or aggregated by include: earned points (i.e., block 504), the application of points to rewards (i.e., block 506), information obtained from real-world values (including non-biometric or physiological attributes at block 602 of FIG. 6), and/or the alteration of the user's world through inactivity (see block 706 of FIG. 7) may have altered the user's ability to earn virtual points or rewards from virtual activity and/or physical activity. Those skilled in the art will readily appreciate that the examples of information provided (as well as the ordering of the information) in the context of block 806 is merely for illustrative purposes and that the invention is not limited to the information provided in FIG. 8. In certain embodiments, the determination at decision 804 may consider previously collected information in combination with initiating the gathering of additional information.

An affirmative finding at decision 804 may result in updating the user's account with pertinent information relating to the new abilities (see block 808). In one embodiment, the information may unlock the ability to build a virtual structure (such as an arena) or a virtual natural feature (such as a mountain, lake, forest), or a combination of both (such as a lake with a ski boat). The user may have the opportunity to construct a hiking trail, invite virtual players to their region (or places such as gym 406) within a region 402 or other possibilities.

Instead of providing virtual assets or points to users, further embodiments relate to unlocking objectives which may require the user to perform real-world physical activities. For example, a new objective may require a user to conduct a specific type or quantity of physical activity. In one embodiment, an objective may require at least two users to conduct a physical activity to unlock virtual content, such as for example, an arena. In one embodiment, a multi-user game may include multiple game types. In one embodiment, the opportunity is a challenge that pits two or more users against each other. Depending on the implementation, less than all of the participants may be awarded with a virtual reward or points. In one embodiment, a game may require users to avoid registering the shortest run of all participants. In another example, the game may require users to exercise as much as possible. In yet another example, the game may require the users to avoid being the last to complete an activity. Other game types may also be defined. For example, users may customize their own game types including defining an objective, a game time period, a punishment/consequence and the like. In certain embodiments, one or more users may wager virtual points or rewards. Exemplary systems and methods are described in U.S. Prov. Pat. App. No. 61/423,723, filed Dec. 16, 2010, the contents of which are hereby incorporated by reference in their entirety for any and all non-limited purposes.

In another embodiment, the user may have to physically run a distance (such as 1 mile) to unlock a virtual scoreboard for an arena. Yet, in other embodiments, the types of real-world physical activities that may be performed by a user to earn virtual points or rewards may depend on the user's virtual assets. For example, if a user's region (e.g., region 302) has been built up to include a large hiking trail up a mountain, the user may be able to conduct physical activity that counts towards running up the mountain. In another embodiment, certain soccer-related physical movements or activities may not be considered in the awarding of virtual goods or points, unless the user has a virtual soccer arena.

Illustrative Computing Devices

FIG. 10A illustrates an example of a personal training system 1000 in accordance with example embodiments. Example system 1000 may include one or more electronic devices, such as computer 1002. Computer 1002 may comprise a mobile terminal, such as a telephone, music player, tablet, netbook or any portable device. In other embodiments, computer 1002 may comprise a set-top box (STB), desktop computer, digital video recorder(s) (DVR), computer server(s), and/or any other desired computing device. In certain configurations, computer 1002 may comprise a gaming console, such as for example, a Microsoft® XBOX, Sony® Playstation, and/or a Nintendo® Wii gaming consoles. Those skilled in the art will appreciate that these are merely example consoles for descriptive purposes and this disclosure is not limited to any console or device.

Turning briefly to FIG. 10B, computer 1002 may include computing unit 1004, which may comprise at least one processing unit 1006. Processing unit 1006 may be any type of processing device for executing software instructions, such as for example, a microprocessor device. Computer 1002 may include a variety of non-transitory computer readable media, such as memory 1008. Memory 1008 may include, but is not limited to, random access memory (RAM) such as RAM 1010, and/or read only memory (ROM), such as ROM 1012. Memory 1008 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by computer 1002.

The processing unit 1006 and the system memory 1008 may be connected, either directly or indirectly, through a bus 1014 or alternate communication structure to one or more peripheral devices. For example, the processing unit 1006 or the system memory 1008 may be directly or indirectly connected to additional memory storage, such as a hard disk drive 1016, a removable magnetic disk drive, an optical disk drive 1018, and a flash memory card. The processing unit 1006 and the system memory 1008 also may be directly or indirectly connected to one or more input devices 1020 and one or more output devices 1022. The output devices 1022 may include, for example, a display device 1036, television, printer, stereo, or speakers. In some embodiments one or more display devices may be incorporated into eyewear. The display devices incorporated into eyewear may provide feedback to users. Eyewear incorporating one or more display devices also provides for a portable display system. The input devices 1020 may include, for example, a keyboard, touch screen, a remote control pad, a pointing device (such as a mouse, touchpad, stylus, trackball, or joystick), a scanner, a camera or a microphone. In this regard, input devices 1020 may comprise one or more sensors configured to sense, detect, and/or measure athletic movement from a user, such as user 1024, shown in FIG. 10A.

Looking again to FIG. 10A, image-capturing device 1026 and/or sensor 1028 may be utilized in detecting and/or measuring athletic movements of user 1024. In one embodiment, data obtained from image-capturing device 1026 or sensor 1028 may directly detect athletic movements, such that the data obtained from image-capturing device 1026 or sensor 1028 is directly correlated to a motion parameter. For example, and with reference to FIG. 13, image data from image-capturing device 1026 may detect that the distance between sensor locations 1302g and 1302i has decreased and therefore, image-capturing device 1026 alone may be configured to detect that user's 1024 right arm has moved. Yet, in other embodiments, data from image-capturing device 1026 and/or sensor 1028 may be utilized in combination, either with each other or with other sensors to detect and/or measure movements. Thus, certain measurements may be determined from combining data obtained from two or more devices. Image-capturing device 1026 and/or sensor 1028 may include or be operatively connected to one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. Example uses of illustrative sensors 1026, 1028 are provided below in Section I.C, entitled "Illustrative Sensors." Computer 1002 may also use touch screens or image capturing device to determine where a user is pointing to make selections from a graphical user interface. One or more embodiments may utilize one or more wired and/or wireless technologies, alone or in combination, wherein examples of wireless technologies include Bluetooth® technologies, Bluetooth® low energy technologies, and/or ANT technologies.

Illustrative Network

Still further, computer 1002, computing unit 1004, and/or any other electronic devices may be directly or indirectly connected to one or more network interfaces, such as example interface 1030 (shown in FIG. 10B) for communicating with a network, such as network 1032. In the example of FIG. 10B, network interface 1030, may comprise a network adapter or network interface card (NIC) configured to translate data and control signals from the computing unit 1004 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 1030 may employ any suitable connection agent for connecting to a network, including, for example, a wireless transceiver, a power line adapter, a modem, or an Ethernet connection. Network 1032, however, may be any one or more information distribution network(s), of any type(s) or topology(s), alone or in combination(s), such as internet(s), intranet(s), cloud(s), LAN(s). Network 1032 may be any one or more of cable, fiber, satellite, telephone, cellular, wireless, etc. Networks are well known in the art, and thus will not be discussed here in more detail. Network 1032 may be variously configured such as having one or more wired or wireless communication channels to connect one or more locations (e.g., schools, businesses, homes, consumer dwellings, network resources, etc.), to one or more remote servers 1034, or to other computers, such as similar or identical to computer 1002. Indeed, system 1000 may include more than one instance of each component (e.g., more than one computer 1002, more than one display 1036, etc.). Those skilled in the art will appreciate that the network architecture (or any components thereof) shown in FIG. 1 may be used instead of or in addition to the network architecture (or any components thereof) shown in FIG. 10 or 11.

Regardless of whether computer 1002 or other electronic device within network 1032 is portable or at a fixed location, it should be appreciated that, in addition to the input, output and storage peripheral devices specifically listed above, the computing device may be connected, such as either directly, or through network 1032 to a variety of other peripheral devices, including some that may perform input, output and storage functions, or some combination thereof. In certain embodiments, a single device may integrate one or more components shown in FIG. 10A. For example, a single device may include computer 1002, image-capturing device 1026, sensor 1028, display 1036 and/or additional components. In one embodiment, sensor device 1038 may comprise a mobile terminal having a display 1036, image-capturing device 1026, and one or more sensors 1028. Yet, in another embodiment, image-capturing device 1026, and/or sensor 1028 may be peripherals configured to be operatively connected to a media device, including for example, a gaming or media system. Thus, it goes from the foregoing that this disclosure is not limited to stationary systems and methods. Rather, certain embodiments may be carried out by a user 1024 in almost any location.

Illustrative Sensors

Computer 1002 and/or other devices may comprise one or more sensors 1026, 1028 configured to detect and/or monitor at least one fitness parameter of a user 1024. Sensors 1026 and/or 1028 may include, but are not limited to: an accelerometer, a gyroscope, a location-determining device (e.g., GPS), light sensor, temperature sensor (including ambient temperature and/or body temperature), sleep pattern sensors, heart rate monitor, image-capturing sensor, moisture sensor and/or combinations thereof. Network 1032 and/or computer 1002 may be in communication with one or more electronic devices of system 1000, including for example, display 1036, an image capturing device 1026 (e.g., one or more video cameras), and sensor 1028, which may be an infrared (IR) device. In one embodiment sensor 1028 may comprise an IR transceiver. For example, sensors 1026, and/or 1028 may transmit waveforms into the environment, including towards the direction of user 1024 and receive a "reflection" or otherwise detect alterations of those released waveforms. In yet another embodiment, image-capturing device 1026 and/or sensor 1028 may be configured to transmit and/or receive other wireless signals, such as radar, sonar, and/or audible information. Those skilled in the art will readily appreciate that signals corresponding to a multitude of different data spectrums may be utilized in accordance with various embodiments. In this regard, sensors 1026 and/or 1028 may detect waveforms emitted from external sources (e.g., not system 1000). For example, sensors 1026 and/or 1028 may detect heat being emitted from user 1024 and/or the surrounding environment. Thus, image-capturing device 1026 and/or sensor 1028 may comprise one or more thermal imaging devices. In one embodiment, image-capturing device 1026 and/or sensor 1028 may comprise an IR device configured to perform range phenomenology. As a non-limited example, image-capturing devices configured to perform range phenomenology are commercially available from Flir Systems, Inc. of Portland, Oreg. Although image capturing device 1026 and sensor 1028 and display 1036 are shown in direct (wirelessly or wired) communication with computer 1002, those skilled in the art will appreciate that any may directly communicate (wirelessly or wired) with network 1032.

Multi-Purpose Electronic Devices

User 1024 may possess, carry, and/or wear any number of electronic devices, including sensory devices 1038, 1040, 1042, and/or 1044. In certain embodiments, one or more devices 1038, 1040, 1042, 1044 may not be specially manufactured for fitness or athletic purposes. Indeed, aspects of this disclosure relate to utilizing data from a plurality of devices, some of which are not fitness devices, to collect, detect, and/or measure athletic data. In one embodiment, device 1038 may comprise a portable electronic device, such as a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as both an output device for a computer (e.g., outputting music from a sound file or pictures from an image file) and a storage device. In one embodiment, device 1038 may be computer 1002, yet in other embodiments, computer 1002 may be entirely distinct from device 1038. Regardless of whether device 1038 is configured to provide certain output, it may serve as an input device for receiving sensory information. Devices 1038, 1040, 1042, and/or 1044 may include one or more sensors, including but not limited to: an accelerometer, a gyroscope, a location-determining device (e.g., GPS), light sensor, temperature sensor (including ambient temperature and/or body temperature), heart rate monitor, image-capturing sensor, moisture sensor and/or combinations thereof. In certain embodiments, sensors may be passive, such as reflective materials that may be detected by image-capturing device 1026 and/or sensor 1028 (among others). In certain embodiments, sensors 1044 may be integrated into apparel, such as athletic clothing. For instance, the user 1024 may wear one or more on-body sensors 1044*a-b*. Sensors 1044 may be incorporated into the clothing of user 1024 and/or placed at any desired location of the body of user 1024. Sensors 1044 may communicate (e.g., wirelessly) with computer 1002, sensors 1028, 1038, 1040, and 1042, and/or camera 1026. Examples of interactive gaming apparel are described in U.S. patent application Ser. No. 10/286,396, filed Oct. 30, 2002, and published as U.S. Pat. Pub, No. 2004/0087366, the contents of which are incorporated herein by reference in its entirety for any and all non-limiting purposes. In certain embodiments, passive sensing surfaces may reflect waveforms, such as infrared light, emitted by image-capturing device 1026 and/or sensor 1028. In one embodiment, passive sensors located on user's 1024 apparel may comprise generally spherical structures made of glass or other transparent or translucent surfaces which may reflect waveforms. Different classes of apparel may be utilized in which a given class of apparel has specific sensors configured to be located proximate to a specific portion of the user's 1024 body when properly worn. For example, golf apparel may include one or more sensors positioned on the apparel in a first configuration and yet soccer apparel may include one or more sensors positioned on apparel in a second configuration.

Devices 1038-1044 may communicate with each other, either directly or through a network, such as network 1032. Communication between one or more of devices 1038-1044 may communicate through computer 1002. For example, two or more of devices 1038-1044 may be peripherals operatively connected to bus 1014 of computer 1002. In yet another embodiment, a first device, such as device 1038 may communicate with a first computer, such as computer 1002 as well as another device, such as device 1042, however, device 1042 may not be configured to connect to computer 1002 but may communicate with device 1038. Those skilled in the art will appreciate that other configurations are possible.

Some implementations of the example embodiments may alternately or additionally employ computing devices that are intended to be capable of a wide variety of functions, such as a desktop or laptop personal computer. These computing devices may have any combination of peripheral devices or additional components as desired. Also, the components shown in FIG. 10B may be included in the server 1034, other computers, apparatuses, etc.

Illustrative Apparel/Accessory Sensors

In certain embodiments, sensory devices 1038, 1040, 1042 and/or 1044 may be formed within or otherwise associated with user's 1024 clothing or accessories, including a watch, armband, wristband, necklace, shirt, shoe, or the like. Examples of shoe-mounted and wrist-worn devices (devices 1040 and 1042, respectively) are described immediately below, however, these are merely example embodiments and this disclosure should not be limited to such.

Shoe-Mounted Device

In certain embodiments, sensory device 1040 may comprise footwear which may include one or more sensors, including but not limited to: an accelerometer, location-sensing components, such as GPS, and/or a force sensor system. FIG. 11A illustrates one example embodiment of a sensor system 1102. In certain embodiments, system 1102 may include a sensor assembly 1104. Assembly 1104 may comprise one or more sensors, such as for example, an accelerometer, location-determining components, and/or force sensors. In the illustrated embodiment, assembly 1104 incorporates a plurality of sensors, which may include force-sensitive resistor (FSR) sensors 1106. In yet other embodiments, other sensor(s) may be utilized. Port 1108 may be positioned within a sole structure 1109 of a shoe. Port 1108 may optionally be provided to be in communication with an electronic module 1110 (which may be in a housing 1111) and a plurality of leads 1112 connecting the FSR sensors 1106 to the port 1108. Module 1110 may be contained within a well or cavity in a sole structure of a shoe. The port 1108 and the module 1110 include complementary interfaces 1114, 1116 for connection and communication.

In certain embodiments, at least one force-sensitive resistor 1106 shown in FIG. 11A may contain first and second electrodes or electrical contacts 1118, 1120 and a force-sensitive resistive material 1122 disposed between the electrodes 1118, 1120 to electrically connect the electrodes 1118, 1120 together. When pressure is applied to the force-sensitive material 1122, the resistivity and/or conductivity of the force-sensitive material 1122 changes, which changes the electrical potential between the electrodes 1118, 1120. The change in resistance can be detected by the sensor system 1102 to detect the force applied on the sensor 1116. The force-sensitive resistive material 1122 may change its resistance under pressure in a variety of ways. For example, the force-sensitive material 1122 may have an internal resistance that decreases when the material is compressed, similar to the quantum tunneling composites described in greater detail below. Further compression of this material may further decrease the resistance, allowing quantitative measurements, as well as binary (on/off) measurements. In some circumstances, this type of force-sensitive resistive behavior may be described as "volume-based resistance," and materials exhibiting this behavior may be referred to as "smart materials." As another example, the material 1122 may change the resistance by changing the degree of surface-to-surface contact. This can be achieved in several ways, such as by using micro-projections on the surface that raise the surface resistance in an uncompressed condition, where the surface resistance decreases when the microprojections are compressed, or by using a flexible electrode that can be deformed to create increased surface-to-surface contact with another electrode. This surface resistance may be the resistance between the material 1122 and the electrode 1118, 1120 1122 and/or the surface resistance between a conducting layer (e.g., carbon/graphite) and a force-sensitive layer (e.g., a semiconductor) of a multi-layer material 1122. The greater the compression, the greater the surface-to-surface contact, resulting in lower resistance and enabling quantitative measurement. In some circumstances, this type of force-sensitive resistive behavior may be described as "contact-based resistance." It is understood that the force-sensitive resistive material 1122, as defined herein, may be or include a doped or non-doped semiconducting material.

The electrodes 1118, 1120 of the FSR sensor 1116 can be formed of any conductive material, including metals, carbon/graphite fibers or composites, other conductive composites, conductive polymers or polymers containing a conductive material, conductive ceramics, doped semiconductors, or any other conductive material. The leads 1112 can be connected to the electrodes 1118, 1120 by any suitable method, including welding, soldering, brazing, adhesively joining, fasteners, or any other integral or non-integral joining method. Alternately, the electrode 1118, 1120 and associated lead 1112 may be formed of a single piece of the same material.

Wrist-Worn Device

As shown in FIG. 11B, device 1126 (which may resemble or be sensory device 1042 shown in FIG. 10A) may be configured to be worn by user 1024, such as around a wrist, arm, ankle or the like. Device 1126 may monitor athletic movements of a user, including all-day activity of user 1024. In this regard, device assembly 1126 may detect athletic movement during user's 1024 interactions with computer 1002 and/or operate independently of computer 1002. For example, in one embodiment, device 1126 may be an-all day activity monitor that measures activity regardless of the user's proximity or interactions with computer 1002. Device 1126 may communicate directly with network 1032 and/or other devices, such as devices 1038 and/or 1040. In other embodiments, athletic data obtained from device 1126 may be utilized in determinations conducted by computer 1002, such as determinations relating to which exercise programs are presented to user 1024. In one embodiment, device 1126 may also wirelessly interact with a mobile device, such as device 1038 associated with user 1024 or a remote website such as a site dedicated to fitness or health related subject matter. At some predetermined time, the user may wish to transfer data from the device 1126 to another location.

As shown in FIG. 11B, device 1126 may include an input mechanism, such as a depressible input button 1128 assist in operation of the device 1126. The input button 1128 may be operably connected to a controller 1130 and/or any other electronic components, such as one or more of the elements discussed in relation to computer 1002 shown in FIG. 10B. Controller 11230 may be embedded or otherwise part of housing 1132. Housing 1132 may be formed of one or more materials, including elastomeric components and comprise one or more displays, such as display 1134. The display may be considered an illuminable portion of the device 1126. The display 1134 may include a series of individual lighting elements or light members such as LED lights 1134 in an exemplary embodiment. The LED lights may be formed in an array and operably connected to the controller 1130. Device 1126 may include an indicator system 1136, which may also be considered a portion or component of the overall display 1134. It is understood that the indicator system 1136 can operate and illuminate in conjunction with the display 1134 (which may have pixel member 1135) or completely separate from the display 1134. The indicator system 1136 may also include a plurality of additional lighting elements or light members 1138, which may also take the form of LED lights in an exemplary embodiment. In certain embodiments, indicator system may provide a visual indication of goals, such as by illuminating a portion of lighting members 1138 to represent accomplishment towards one or more goals.

A fastening mechanism 1140 can be unlatched wherein the device 1126 can be positioned around a wrist of the user 1024 and the fastening mechanism 1140 can be subsequently placed in a latched position. The user can wear the device 1126 at all times if desired. In one embodiment, fastening mechanism 1140 may comprise an interface, including but not limited to a USB port, for operative interaction with computer 1002 and/or devices 1038, 1040.

In certain embodiments, device 1126 may comprise a sensor assembly (not shown in FIG. 11B). The sensor assembly may comprise a plurality of different sensors. In an example embodiment, the sensor assembly may comprise or permit operative connection to an accelerometer (including in the form of a multi-axis accelerometer), heart rate sensor, location-determining sensor, such as a GPS sensor, and/or other sensors. Detected movements or parameters from device's 1042 sensor(s), may include (or be used to form) a variety of different parameters, metrics or physiological characteristics including but not limited to speed, distance, steps taken, and energy expenditure such as calories, heart rate, sweat detection, effort, oxygen consumed, and/or oxygen kinetics. Such parameters may also be expressed in terms of activity points or currency earned by the user based on the activity of the user.

Illustrative Athletic Monitoring Methods

One or more components of system 1000 may prompt a user to perform one or more exercises, monitor user movement while performing the exercises, and provide the user with an energy expenditure estimate based on their movement. System 1000 may analyze a user's form to determine if the user is making an exercise more or less difficult, and adjust the energy expenditure estimate accordingly. Energy expenditure estimates may be, or comprise, an estimate of calories burned by the user. In certain embodiments, energy expenditure determinations may be based on, and/or conveyed as a point system. In one embodiment, calories may be converted to a point system, yet in other embodiments, measurements may be directly obtained in one or more point systems. In one implementation, activity points may be based upon: form, body movements, and/or completion of certain activities. In further embodiments, energy expenditure calculations may comprise determinations relating to: effort, oxygen consumed, and/or oxygen kinetics of the user. In one embodiment, computer 1002, camera 1026, sensor 1028, and display 1036 may be implemented within the confines of a user's residence, although other locations, including gyms and/or businesses are contemplated. Further, as discussed above, computer 1002 may be a portable device, such as a cellular telephone, therefore, one or more aspects discussed herein may be conducted in almost any location. In this regard, the example embodiments of this disclosure are discussed in the context of being implemented with one or more of the example components of system 1000. Those skilled in the art will appreciate that reference(s) to a particular component, such as computer 1002, is not meant to be limiting, but rather to provide an illustrative example of one of many possible implementations. Thus, although certain components may be referenced, it is to be assumed that other components of system 1000 may be utilized unless expressly disclaimed or physically impossible. Further, aspects disclosed herein are not limited to example system 1000.

Monitoring User Movements

While exercising, the system 1000 may use one or more techniques to monitor user movement. FIG. 12 illustrates an example flow diagram of a method for calculating an energy expenditure estimate for a user that accounts for a user's form while exercising as part of the estimate, in accordance with example embodiments. The method may be implemented by a computer, such as, for example, computer 1002, device 1038, 1040 and/or 1042, as well as or other apparatuses. The blocks shown in FIG. 12 may be rearranged, some blocks may be removed, additional blocks may be added, each block may be repeated one or more times, and the flow diagram may be repeated one or more times. The flow diagram may begin at block 1202.

Perform User Assessment

In block 1202, the method may include performing an initial assessment of the user. A user, such as user 1024, may be positioned in range of a sensor, such as in front of the image capturing device 1026 and/or sensor 1028, which may comprise an infrared transceiver. Display 1036 may present a representation of user 1024 that may be a "mirror-image" or depict a virtual avatar, such as a user avatar, that moves to correspond with user movement. Computer 1002 may prompt the user to move into a certain region relative to the image capturing device 1026 and/or relative to the infrared transceiver 1028 so that the user is within frame and/or range. When properly positioned, system 1000 may process movement of the user. Although the term "initial" has been utilized, this assessment may occur each time the user initiates system 1000, performs certain movements, upon passage of time, or for any other reason. Thus, references to assessments herein are not limited to a single assessment.

Identify Sensory Locations

One or more components shown in FIG. 1 or FIG. 10, such as system 1000 shown in FIG. 10 may process sensory data to identify user movement data. In one embodiment, sensory locations on a user's body may be identified. With reference to FIG. 13, sensory locations 1302a-1302o may correspond to locations of interest on the user's 1024 body (e.g., ankles, elbows, shoulders, etc.). For example, images of recorded video, such as from camera 1026, may be utilized in an identification of the sensory locations 1302a-1302o. For example, the user may stand a certain distance, which may or may not be predefined, from the camera 1026, and system 1000 may process the images to identify the user 1024 within the video, for example, using disparity mapping techniques. In an example, image capturing device 1026 may be a stereo camera having two or more lenses that are spatially offset from one another and that simultaneously capture two or more images of the user. System 1000 may process the two or more images taken at a same time instant to generate a disparity map for determining a location of certain parts of the user's body in each image (or at least some of the images) in the video using a coordinate system (e.g., Cartesian coordinates). The disparity map may indicate a difference between an image taken by each of the offset lenses.

In a second example, one or more sensors may be located on or proximate to the user's 1024 body at the sensory locations 1302a-1302o or the user 1024 may wear a suit having sensors situated at various locations. Yet, in other embodiments, sensor locations may be determined from other sensory devices, such as devices 1038, 1040 and/or 1042. In this regard, sensors may be physical sensors located on a user's clothing, yet in other embodiments, sensor locations 1302a-1302o may be based upon identification of relationships between two moving body parts. For example, sensor location 1302a may be determined by identifying motions of user 1024. In this regard, the overall shape or portion of a user's body may permit identification of certain body parts. Regardless of whether a camera, such as camera 1026, is utilized and/or a physical sensor located on the user 1024, such as sensors within device(s) 1038, 1040, 1042 are utilized, the sensors may sense a current location of a body part and/or track movement of the body part.

In certain embodiments, a time stamp may be added to the data collected (such as collected part of block 1202 in FIG. 12) indicating a specific time when a body part was at a certain location. Sensor data may be received at computer 1002 (or other device) via wireless or wired transmission. A computer, such as computer 1002 and/or devices 1038, 1040, 1042, may process the time stamps to determine the locations of the body parts using a coordinate system (e.g., Cartesian coordinates) within each (or at least some) of the images in the video. Data received from camera 1026 may be corrected, modified, and/or combined with data received from one or more other devices 1038, 1040, and 1042.

In a third example, system 1000 may use infrared pattern recognition to detect user movement and locations of body parts of the user 1024. For example, sensor 1028 may include an infrared transceiver, which may be part of camera 1026, or another device, that may emit an infrared signal to illuminate the user's 1024 body using infrared signals. The infrared transceiver 1028 may capture a reflection of the infrared signal from the body of user 1024. Based on the reflection, the system 1000 may identify a location of certain parts of the user's body using a coordinate system (e.g., Cartesian coordinates) at particular instances in time. Which and how body parts are identified may be predetermined based on a type or types of exercise a user is requested to perform.

As part of a workout routine, system 1000 may make an initial postural assessment of the user 1024 as part of the initial user assessment in block 1202 of FIG. 12. System 1000 may analyze front and side images of a user 1024 to determine a location of one or more of a user's shoulders, upper back, lower back, hips, knees, and ankles. On-body sensors and/or infrared techniques may also be used, either alone or in conjunction with camera 1026, to determine the locations of various body parts for the postural assessment. For example, system 1000 may determine assessment lines 1024a-g to determine the locations of a various points on a user's body, such as, for example, ankles, knees, hips, upper back, lower back, and shoulders.

Energy Expenditure

Certain aspects measure a user's performance based at least partially on energy expenditure, such as but not limited to a quantity of calories burned. The following provides an example equation for calculating an amount of calories burned by a user during a workout.

$$\text{Calories burned} = \text{BMR} * (\text{Activity modifier}) * (\text{Completeness modifier}). \quad \text{Equation (1)}$$

In equation (1), BMR is an acronym for Basal Metabolic Rate. The system 1000 may calculate the BMR using the Mifflin-St. Jeor Equation, BMR=(10*w)+(6.25*h)−(5.0*a)+(5 for men, −161 for women), where "*" is the multiplication symbol, "w"=weight in kilograms, "h"=height in centimeters, "a"=age in years. The system 100 may also use the Harris-Benedict equation instead of or, in addition to, the Mifflin-St. Jeor Equation.

The activity modifier may be an adjustment corresponding to a type of exercise being performed by a user. The activity modifier may be larger for more strenuous exercises, and smaller for less strenuous. System 1000 may store a file containing activity modifiers, where each activity modifier may have a value for a particular exercise type. Two or more exercises may have activity modifiers with a same value, or certain exercise may have a unique value for the activity modifier. The activity modifier may have a default value. In one example embodiment, the default value may be 0.1. In a second embodiment, the default value may be 1.0. The default value may be any value, including 0.0. System 1000 may update the default value to correspond to the activity modifier for an exercise currently being performed by the user. Over a duration of the workout, system 1000 may use different ones of the activity modifiers to calculate calories burned using equation (1) corresponding to different exercises the user is prompted to perform. One or more factors may contribute to the activity modifier and/or adjustment of the modifier. Examples include, but are not limited to: pace, type of exercise, duration, and combinations thereof. Further, activity modifiers and/or variation of activity modifiers may be determined from predetermined values (such as a value assigned to an exercise or movement that a user is prompted to perform), the user's performance, information from a MET table on a particular exercise, and combinations thereof.

The completeness modifier may be used for adjusting the BMR based on how well a user's form corresponds to a desired form when performing an exercise. In an example, the completeness modifier may indicate what percentage of full movement was achieved for each repetition when performing an exercise (e.g., determine a percentage of a measured angle between the user's torso and thighs for a particular repetition of an exercise relative to a desired angle), or may be an average of the percentage of full movement for a predetermined number of repetitions (e.g., last three exercises, last five exercises, all exercises, etc.). The completeness modifier may have a default value. In one example embodiment, the default value may be 0.1. In a second embodiment, the default value may be 1.0. The default value may be any value, including 0.0. System 1000 may update the completeness modifier over time based on how well the user's form conforms to a desired form. One or more factors may contribute to the activity modifier and/or adjustment of the modifier. Examples include, but are not limited to: pace, type of exercise, duration, and combinations thereof. Further, activity modifiers and/or variation of activity modifiers may be determined from predetermined values (such as a value assigned to an exercise or movement that a user is prompted to perform), the user's performance, and combinations thereof.

Equation (2), provided below, may be utilized in further embodiments.

$$\text{Calories burned} = \text{BMR} * (\text{Activity modifier}) * (\text{Completeness modifier}) * (\text{Multiply Modifier}) + (\text{Addition Modifier}) \quad \text{Equation (2)}$$

Values for BMR, Activity Modifier, and/or Completeness Modifier of Equation (2) may be determined in accordance with one or more embodiments described above in reference to Equation (1). In one embodiment, the value of the Multiply Modifier may be defined for each type of exercise. In one example embodiment, the default value may be 0.1. In a second embodiment, the default value may be 1.0. The default value may be any value, including 0.0. System 1000 may update the Multiply Modifier during a workout to correspond to a type of exercise the user is prompted to perform. In certain embodiments, the Activity Modifier may be obtained (either partially or entirely) from empirical data.

In certain embodiments, the value of the Addition Modifier may be defined for each type of exercise. In one example embodiment, the default value may be 0.1. In a second embodiment, the default value may be 1.0. The default value may be any value, including 0.0. System 1000 may update the Addition Modifier during a workout to correspond to a type of exercise the user is prompted to perform. In certain embodiments, the Activity Modifier may be obtained (either partially or entirely) from empirical data.

System 1000 may calculate the calories burned over a duration of a workout, which may incorporate the utilization of equations (1) or (2). System 1000 may cause the display 1036 to display a running total of calories burned. In certain embodiments, the total may be determined for one or more completed repetitions and one or more completed sets of each exercise. System 1000 may also calculate and cause display of calories burned by type of exercise performed. Other information such as, for example, peak/minimum/average calorie burning rate by workout, by repetition, by set, or by exercise type may also be calculated and displayed. System 1000 may periodically determine an amount of calories burned by the user while exercising using equation (1). System 1000 may indicate a current amount of calories burned that is continually updated over a workout (e.g., a running total), or may update the calories burned amount at predetermined times (e.g., user completes a set of a first type of exercise and begins a set of second type of exercise, at the end of the workout session, etc.). System 1000 may also inform the user how many calories were burned during each repetition as well as in each set of an exercise.

One or more of the inputs and/or variables used in the determination of caloric expenditure (such as with equation (1)) may remain the same regardless of the type of exercise being performed by the user, yet others may vary. For example, the BMR may be the same over the entire workout as a user's weight, height, and age do not change appreciably over the course of a workout. Further, one or more of the Activity modifier, Completeness modifier, Multiply Modifier, and Addition Modifier may vary over the workout. The values (and/or variation) of the values may depend on the type exercise currently being performed by the user.

The Completeness modifier may vary from repetition to repetition. As noted above, system 1000 may generate the Completeness modifier based on monitoring a user's form while they perform an exercise. Generally, an exercise includes a sequence of motions to perform one repetition, and a user typically performs a set that includes two or more repetitions. A user's form may vary from repetition to repetition, and so may the Completeness modifier.

System 1000 may determine calories burned using equation (1) based on a Completeness modifier that varies from repetition to repetition, or based on a filtered version of the Completeness modifier. To filter the Completeness modifier, the system 1000 may, for example, determine a Completeness modifier for one or more repetitions, may average some or all of the Completeness modifiers, and may use the average in equation (1). Also, system 1000 may generate the Completeness modifier as a weighted average, where Completeness modifiers of some repetitions may be given greater weight than others. For example, system 1000 may apply a decaying function where more recent Completeness modifiers are weighted more heavily than less recent when generating an average.

System 1000 may also allow a user to make desired movements, and calculate an amount of calories burned for such movement. In one embodiment, all detected movements may be utilized in calculations. Yet in other embodiments, only certain (e.g., system supported and/or those prompted to be performed) movements may be considered. System 1000 may process data from image capturing device 1026 and/or from various sensors to attempt to classify a user's movement. For example, system 1000 may compare the user's movement to other known movements for which a MET table has been defined. If a user's movement corresponds to a known movement for which a MET table has been defined, then system 1000 may use the identified MET table for calculating an amount of calories burned.

If the user's movement does not match an exercise defined by a MET table, the system 1000 may identify one or more exercises that include movements similar to the movement being performed by the user. For example, system 1000 may determine that the user's lower body moves similar to a squat and upper body moves similar to a pushup. System 1000 may calculate the number of calories the user would burn using the identified MET tables as if the users were doing a squat, and as if they were doing a pushup, as approximations for the amount of calories burned by the user. In further embodiments, a new entry may be created. In this regard, certain embodiments may permit the entry and later identification of new movements and/or exercises. In certain embodiments, the user may provide inputs regarding an approximate caloric expenditure for an unidentified movement/exercise. Yet in other embodiments, system 1000 may calculate caloric expenditure, such as from one or more sensors as discussed herein. In still yet further embodiments, system 1000 may utilize one or more sensor readings as well as an input from a user (and/or third-party) in determining attributes, such as caloric expenditure, for previously unknown movements or exercises. Examples of estimating caloric expenditure without MET tables, may include but are not limited to, determining changes in potential energy. Examples of using changes in potential energy are provided in the next section.

System 1000 may be configured to transmit calories burned estimates to a social networking website. The users may be ranked based on their total number of calories burned for a desired time interval (e.g., rank by day, week, month, year, etc.). With reference again to FIG. 12, the method may end or may return to any of the preceding blocks.

What is claimed is:

1. A system comprising:
a virtual world server comprising one or more processors and memory storing computer-executable instructions that, when executed by the one or more processors, cause the virtual world server to:
provide a virtual world comprising a plurality of virtual regions, wherein each virtual region is associated with one of a plurality of users, wherein each user is represented in the virtual world by one of a plurality of avatars, and wherein individual virtual regions of the plurality of virtual regions are traversable by individual avatars of the plurality of avatars,
prompt a user of the plurality of users to perform a real-world physical activity,
reward the user in the virtual world in response to determining, based on sensor data characterizing movement of the user and a calculation of completeness modifiers that weight exercises completed recently more heavily than less recent exercises, that the user performed a threshold level of the real-world physical activity, and
penalize the user in the virtual world in response to determining, based on the sensor data characterizing the movement of the user, that the user did not perform the threshold level of the real-world physical activity;
a client computing device in signal communication with the virtual world server and operated by the user to access the virtual world; and
a monitoring device comprising at least one sensor configured to detect the movement of the user and obtain at least a portion of the sensor data characterizing the movement of the user, wherein the monitoring device is configured to detect the movement of the user at a location from which the client computing device is not accessible to the user.

2. The system of claim 1, wherein:
the instructions, when executed by the virtual world server, further cause the virtual world server to:
determine a geographic location of the user,
determine an environmental condition of the geographic location, and
select a reward based on the environmental condition.

3. The system of claim 2, wherein:
the instructions, when executed by the virtual world server, further cause the virtual world server to:
visually represent the environmental condition of the geographic location of the user in the virtual world at a virtual region of the plurality of virtual regions that is associated with the user.

4. The system of claim 1, wherein:
the threshold level of the real-world physical activity comprises:

a threshold quantity of time the user spends conducting the real-world physical activity,
a threshold value of a physiological or biological parameter of the user, or
a threshold distance traveled by the user within a predetermined window of time.

5. The system of claim 1, wherein:
the instructions, when executed by the virtual world server, further cause the virtual world server to:
present, in the virtual world, live data characterizing performance of the real-world physical activity being performed by the user.

6. The system of claim 1, wherein:
the instructions, when executed by the virtual world server, further cause the virtual world server to:
visually represent an avatar of the plurality of avatars performing the real-world physical activity in the virtual world either during or after performance of the real-world physical activity by the user, the avatar being associated with the user.

7. The system of claim 1, wherein:
the instructions, when executed by the virtual world server, further cause the virtual world server to:
determine a geographic location of the user,
determine a real-world feature of the geographic location, and
visually represent the real-world feature of the geographic location of the user in the virtual world at a virtual region of the plurality of virtual regions that is associated with the user,
wherein the real-world feature comprises a man-made object or a natural object located proximate to the geographic location of the user.

8. The system of claim 1, wherein:
the instructions, when executed by the virtual world server, further cause the virtual world server to:
determine a geographic location of the user,
select the real-world physical activity the user is prompted to perform based on the geographic location of the user.

9. A method comprising:
by a virtual world server comprising one or more processors, memory, and a communication interface:
providing a virtual world comprising a plurality of virtual regions, wherein each virtual region is associated with one of a plurality of users, wherein each user is represented in the virtual world by one of a plurality of avatars, and wherein individual virtual regions of the plurality of virtual regions are traversable by individual avatars of the plurality of avatars,
providing, to a client computing device operated by a user of the plurality of users, access to the virtual world via the communication interface,
prompting the user to perform a real-world physical activity,
receiving sensor data characterizing movement of the user from a monitoring device comprising at least one sensor configured to detect the movement of the user and obtain at least a portion of the sensor data,
wherein the monitoring device is configured to detect the movement of the user at a location from which the client computing device is not accessible to the user, and
either (i) rewarding the user in the virtual world in response to determining, based on the sensor data characterizing the movement of the user and a calculation of completeness modifiers that weight exercises completed recently more heavily than less recent exercises, that the user performed a threshold level of the real-world physical activity, or (b) penalizing the user in the virtual world in response to determining, based on the sensor data characterizing the movement of the user, that the user did not perform the threshold level of the real-world physical activity.

10. The method of claim 9, further comprising:
by the virtual world server:
determining a geographic location of the user,
determining an environmental condition of the geographic location, and
selecting a reward based on the environmental condition.

11. The method of claim 9, wherein:
the threshold level of the real-world physical activity comprises:
a threshold quantity of time the user spends conducting the real-world physical activity,
a threshold value of a physiological or biological parameter of the user, or
a threshold distance traveled by the user within a predetermined window of time.

12. The method of claim 9, further comprising:
by the virtual world server:
presenting, in the virtual world, live data characterizing performance of the real-world physical activity being performed by the user.

13. The method of claim 9, further comprising:
by the virtual world server:
visually representing an avatar of the plurality of avatars performing the real-world physical activity in the virtual world either during or after performance of the real-world physical activity by the user, the avatar being associated with the user.

14. The method of claim 9, further comprising:
by the virtual world server:
determining a geographic location of the user,
determining a real-world feature of the geographic location, and
visually representing the real-world feature of the geographic location of the user in the virtual world at a virtual region of the plurality of virtual regions that is associated with the user,
wherein the real-world feature comprises a man-made object or a natural object located proximate to the geographic location of the user.

15. Non-transitory computer-readable media having computer-executable instructions stored thereon that, when executed by one or more processors of a virtual world server, cause the virtual world server to:
provide a virtual world comprising a plurality of virtual regions, wherein each virtual region is associated with one of a plurality of users, wherein each user is represented in the virtual world by one of a plurality of avatars, and wherein individual virtual regions of the plurality of virtual regions are traversable by individual avatars of the plurality of avatars,
provide, to a client computing device operated by a user of the plurality of users, access to the virtual world via a communication interface of the virtual world server,
prompt the user to perform a real-world physical activity,
receive sensor data characterizing movement of the user from a monitoring device comprising at least one sensor configured to detect the movement of the user and obtain at least a portion of the sensor data, wherein the monitoring device is configured to detect the movement of the user at a location from which the client computing device is not accessible to the user, reward the user in the virtual world in response to determining, based on the sensor data characterizing the movement of the user and a calculation of completeness modifiers that weight exercises completed recently more heavily than less recent exercises, that the user performed a threshold level of the real-world physical activity, penalize the user in the virtual world in response to determining, based on the sensor data characterizing the movement of the user that the user did not perform the threshold level of the real-world physical activity.

16. The non-transitory computer-readable media of claim 15, wherein the instructions, when executed, further cause the virtual world server to:

determine a geographic location of the user, determine an environmental condition of the geographic location, and select a reward based on the environmental condition.

17. The non-transitory computer-readable media of claim 15, wherein the instructions, when executed, further cause the virtual world server to:

present, in the virtual world, live data characterizing performance of the real-world physical activity being performed by the user.

18. The non-transitory computer-readable media of claim 15, wherein the instructions, when executed, further cause the virtual world server to:

visually represent an avatar of the plurality of avatars performing the real-world physical activity in the virtual world either during or after performance of the real-world physical activity by the user, the avatar being associated with the user.

19. The non-transitory computer-readable media of claim 15, wherein the instructions, when executed, further cause the virtual world server to:

determine a geographic location of the user, determine a real-world feature of the geographic location, and visually represent the real-world feature of the geographic location of the user in the virtual world at a virtual region of the plurality of virtual regions that is associated with the user, wherein the real-world feature comprises a man-made object or a natural object located proximate to the geographic location of the user.

20. The non-transitory computer-readable media of claim 15, wherein the instructions, when executed, further cause the virtual world server to:

determine a geographic location of the user, select the real-world physical activity the user is prompted to perform based on the geographic location of the user.

* * * * *